United States Patent
Yazaki

(10) Patent No.: US 8,027,348 B2
(45) Date of Patent: Sep. 27, 2011

(54) FRAME TRANSFER METHOD AND FRAME TRANSFER DEVICE

(75) Inventor: Takeki Yazaki, Palo Alto, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/784,944

(22) Filed: May 21, 2010

(65) Prior Publication Data
US 2010/0232444 A1    Sep. 16, 2010

Related U.S. Application Data

(63) Continuation of application No. 10/321,357, filed on Dec. 18, 2002, now Pat. No. 7,778,255.

(30) Foreign Application Priority Data

Mar. 14, 2002    (JP) .................................. 2002-070043

(51) Int. Cl.
*H04L 12/28* (2006.01)
(52) U.S. Cl. ..................... 370/397; 370/395.3; 370/409; 370/419
(58) Field of Classification Search .................. 370/397, 370/389, 392, 395.3, 400, 401, 409, 419, 370/420; 709/201
See application file for complete search history.

(56) References Cited

U.S. PATENT DOCUMENTS

| | | | | |
|---|---|---|---|---|
| 5,444,699 | A * | 8/1995 | Watanabe ..................... | 370/397 |
| 5,740,172 | A | 4/1998 | Kang | |
| 5,930,259 | A | 7/1999 | Katsube et al. | |
| 6,104,715 | A * | 8/2000 | Basso et al. .................... | 370/397 |
| 6,185,213 | B1 | 2/2001 | Katsube et al. | |
| 6,188,689 | B1 * | 2/2001 | Katsube et al. ............... | 370/389 |
| 6,336,129 | B1 | 1/2002 | Ise et al. | |
| 6,490,292 | B1 | 12/2002 | Matsuzawa | |
| 6,501,756 | B1 | 12/2002 | Katsube et al. | |
| 6,526,056 | B1 | 2/2003 | Rekhter et al. | |
| 7,035,226 | B2 * | 4/2006 | Enoki et al. .................... | 370/254 |
| 7,136,357 | B2 * | 11/2006 | Soumiya et al. .............. | 370/236 |
| 2001/0050914 | A1 | 12/2001 | Akahane et al. | |

OTHER PUBLICATIONS

"Transparent VLAN Services over MPLS", Internet-Draft, draft-lassere-vkompella-ppvpn-vpls-00.txt, Nov. 2001.

(Continued)

*Primary Examiner* — Hassan Kizou
*Assistant Examiner* — Toan Nguyen
(74) *Attorney, Agent, or Firm* — Brundidge & Stanger, P.C.

(57) ABSTRACT

Disclosed herewith is a network that can connect as many VPNs as possible to itself. In order to realize such a network, in the frame transfer method of the present invention, which enables a transfer path to be formed between nodes in the network so as to transfer frames, a terminal for transmitting frames or node located outside the transfer path, upon transmitting a frame through the transfer path, writes the transfer path selection information related to the transfer path and the output line information related to the output line from the terminating node of the transfer path in the frame according to the destination information set in the frame and transmits the frame to the destination. The starting node of the transfer path decides the transfer path used for transferring the frame according to the transfer path selection information set in the frame to transmit the frame while the terminating node of the transfer path decides the output line used to output the frame therefrom according to the output line set in the frame, thereby transmitting the frame to the output line.

8 Claims, 23 Drawing Sheets

OTHER PUBLICATIONS

"MPLS-VPN", Internet Week 2000, Dec. 19, 2000, URL:http://www.nic.ad.jp/ja/materials/iw/2000/proceedings/T13-lb.PDF.
Technical Report of IEICE; The Institute of Electronics, Information and Communication Engineers, IN97-161, Feb. 1998 (w/partial translation).

IETF Draft "Encapsulation Methods for Transport of Layer 2 Frames Over IP and MPLS Networks", Nov. 2001.
IETF Draft "Transport of Layer 2 Frames Over MPLS", Nov. 2001.
IETF Draft "Transparent VLAN Services Over MPLS", Nov. 2001.

* cited by examiner

446

FRAME TRANSFER METHOD AND FRAME TRANSFER DEVICE

This application is a continuation of U.S. application Ser. No. 10/321,357, filed Dec. 18, 2002, now U.S. Pat. No. 7,778,255, the entirety of which is incorporated herein by reference.

BACKGROUND OF THE INVENTION

1. Field of the Invention

The present invention relates to a frame transfer method, and more particularly to a frame transfer method employed for VPN services for realizing virtual private networks (VPN).

2. Description of Related Art

There is a VPN service proposed for forming a virtual private network (VPN) in an enterprise by connecting a plurality of the enterprise sites separated physically away from one another. In recent years, another VPN service has started. The new VPN service transfers frames according to MAC addresses, which are of the Ethernet (trademark). Each of this type networks is a comparatively small in scale and formed, for example, within an urban community and referred to as a MAN (Metropolitan Area Network).

On the other hand, there is a technique for realizing a wide ranged large scale network configured by a plurality of such the MANs. This technique is an application of the MPLS (Multi Protocol Label Switching) proposed, for example, in the IETF Draft "Encapsulation Methods for Transport of Layer 2 Frames Over IP and MPLS Networks", draft-martini-12 circuit-encap-mpls-04.txt referred to as the conventional technique 1 and in the IETF Draft "Transport of Layer 2 Frames Over MPLS", draft-martini-12-circuit-encap-mpls-08.txt referred to as the conventional technique 2. In those conventional techniques 1 and 2, a path referred to as a tunnel LSP (Label Switching Path) is formed in a backbone network connected to a plurality of MANs and a plurality of paths referred to as VC LSPs are formed in this path (tunnel LSP). A node located at the inlet of the back-born network that connects the MANs adds a tunnel label and a VC label to each received frame. Both of the tunnel and VC labels are identifiers of those LSPs. And, the nodes in the back-born network transfer those frames while the node located at the outlet of the back-born network processes the frames according to their VC labels.

FIG. 2 shows a block diagram of a network to which such a conventional frame transfer method applies.

Hereunder, the conventional techniques 1 and 2 will be described with reference to the block diagram of the network shown in FIG. 2. In the network shown in FIG. 2, the sites LAN-A1 and LAN-A2 of an enterprise A are connected to each other through MAN-1, MAN-3, and a backbone network that connects those MAN-1 and MAN3 respectively. The backbone network is configured by PEs (PE: Provider Edge Node) 1 to 3 located on the edge thereof and PCs (PC: Provider Core Node) 1 to 3. In the backbone network, tunnel LSPs (T-LSP2 and T-LSP4) are formed. The T-LSP2 transfers frames in the direction of PE1->PC2->PC3->PE3 while the T-LSP4 transfers frames in the opposite direction. In the T-LSP2, a VC-LSP-A1 is formed so as to transfer frames from the LAN-A1 to the LAN-A2. In the T-LSP-4, a VC-LSP-A2 is formed so as to transfer frames from the LAN-A2 to the LAN-A1. In addition, another LSP used for communications between each site of an enterprise B and each site of an enterprise C is formed in the backbone network. The LSP illustration is omitted in FIG. 2, however.

PE1 of the backbone network, when receiving a frame from the LAN-A1, adds a tunnel label that is the T-LSP2 identifier and a VC label that is the VC-LSP-A1 identifier to the frame, then transfer the frame to the PC2. The PC2, as well as the PC3 refer to the tunnel label to transfer the frame to the PE3. The PE3 then refers to the VC label to transfer the frame to a line connected to the MAN-3. Consequently, the MAN-1 and is connected to the MAN-3, thereby the VPN service of the enterprise A is realized.

Next, the problems of the conventional techniques 1 and 2 will be described with reference to the network shown in FIG. 1, which is the same as the network shown in FIG. 2. In FIG. 1 are shown only the LSPs formed among the sites of the enterprises A and B.

In the network shown in FIG. 1, the sites LAN-B1 to B4 of the enterprise B are connected to one another through the MAN-1 to MAN-4, as well as the backbone network that connects those MANs. In the backbone network, tunnel LSPs (T-LSP1 and T-LSP3) are formed. The T-LSP1 transfers frames in the direction of PE1->PC1->PE2 and the T-LSP3 transfers frames in the opposite direction. In the backbone network, other tunnels LSP (T-LSP2) and LSP (T-LSP4) are also formed. The LSP (T-LSP2) transfers frames PE1->PC2->PC3->PE3 and the LSP (T-LSP4) transfers frames in the opposite direction. In the T-LSP1, a VC-LSP-B1 is formed so as to transfer frames from the LAN-B1 to the LAN-B2. In the T-LSP3, a VC-LSP-B3 is formed so as to transfer frames in the opposite direction. In the T-LSP2, a VC-LSP-B2 is formed so as to transfer frames from the LAN-B1 to the LAN-B3 and B4. In the T-LSP4, a VC-LSP-B4 is formed so as to transfer frames in the opposite direction. In the backbone network are also formed still other LSPs; an LSP used for the communications among the sites of the enterprise A, an LSP used for communications among the sites of the enterprise C, and an LSP used for the communications between PE2 and PE3, although those LSPs are not shown in FIG. 1.

In a network configured as described above, the PE1, when receiving a frame from the LAN-B1, cannot decide to which of LAN-B2, B3, and B4 the frame should be transmitted. In other words, the PE1 cannot decide which of the tunnels (VC-LSP-B1 in the T-LSP1 and T-LSP-B2 in the T-LSP2) should be used to transfer the frame through the VC-LSP. This is also the same for the PE3, which cannot decide which of the lines connected to MAN-3 and MAN-4 should be used to transfer the frame. Consequently, the conventional techniques 1 and 2 described above cannot connect any site over three or more MANs.

On the other hand, there is a technique for connecting a site over three or more MANs. This technique enables the subject PE to learn an output line number, a tunnel LSP, and a VC-LSP in accordance with the MAC address set in each frame. Such the technique is known well as the conventional technique 3 (IETF Draft "Virtual Private Switched Network Services over an MPLS Network", draft-vkompella-ppvpn-mpls-00.txt) and the conventional technique 4 (IETF Draft "Transparent VLAN Services over MPLS", draft-lasserre-vkopella-ppvpn-tis-00.txt). A PE, when receiving a frame from a PC belonging to the backbone network, stores transfer information consisting of the line number of the line to which the frame is inputted, the tunnel LSP, and the VC-LSP therein in accordance with the source MAC address set in the received frame. And, the PE, when receiving a frame from a MAN node, stores transfer information consisting of the line number of the line to which the frame is inputted therein corresponding to the source MAC address set in the frame. When receiving a frame addressed to the stored MAC address, the PE transfers the frame according to the transfer information corresponding to the MAC address.

Next, the conventional technique 3 will be described in detail with reference to FIG. 1. The PE1, when receiving a frame from the terminal T7 belonging to the LAN-B3, stores the line number of the line connected to the PC2, the VC-LSP-B2, and the T-LSP2 therein in correspondence with the MAC address of the terminal T7. When the PE1 receives a frame addressed to the terminal T7 from the MAN-1, the PE1 transfers the frame according to the line number, the VC-LSP-B2, and the T-LSP2 stored therein as described above. The PE3, when receiving a frame from a terminal T7, stores the line number of the line to which the frame is inputted and the MAC address of the terminal T7 so that the line number and the MAC address are corresponded to each other. And, the PE3, when receiving a frame addressed to the terminal T7 from the PC3, transfers the frame to the line corresponding to the line number stored therein.

As described above, according to any of the conventional techniques 3 and 4, when a frame is received from a MAN, it is possible to decide to which of the remaining two or more MANs the frame should be transmitted. This is why a site can be connected over three or more MANs, thereby the problems of the conventional techniques 1 and 2 are solved.

The conventional techniques 1 to 4 described above, however, are often confronted with the following problem that will arise in construction of a large scale network that comes to include many enterprises (contractors) connected over a plurality of MANs. The conventional techniques 1 and 2 also come to be confronted with another problem that a site connected over three or more MANs as described above cannot be connected to a network that employs any of the conventional techniques 1 and 2.

Furthermore, a network that employs any of the conventional techniques 3 and 4 causes another problem to arise; the capacity of a table provided in each node to store transfer information often becomes insufficient. In other words, every PE that employs any of the conventional techniques 3 and 4 is required to learn such transfer information as output line numbers, tunnel LSPs, VC LSPs in correspondence with the MAC addresses of all the enterprises stored in the PE. For example, the PE1 shown in FIG. 1 is required to learn such the transfer information so as to make it correspond to the MAC addresses of all the terminals T1 to T11 of the enterprises A to C. And, the table provided in such a PE so as to store such transfer information is limited in capacity and due to the limited capacity of the table, the networks that employ any of the conventional techniques 3 and 4 come to be disabled to store information of many enterprises (contractors).

Under such circumstances, it is an object of the present invention to provide a network that can hold information of many more enterprises (contractors) than any conventional networks by forming nodes on the edge of the subject network, which are used to store frame transfer information corresponding to the destination address of each frame.

SUMMARY OF THE INVENTION

In order to solve the above conventional problems, the frame transfer method of the present invention, employed for a network configured by a plurality of nodes and a plurality of terminals connected to one another through a line, enables a transfer path for transferring frames to be formed between nodes in the network, so that a node, upon receiving of a frame from a different node, writes a transfer path identifier used to identify a target transfer path in the frame, thereby the frame is transferred to the destination. A terminal for transferring a received frame or node located outside the transfer path, when transmitting a frame through the transfer path, writes transfer path selection information related to a target transfer path and output line selection information related to an output line of the terminating node of the transfer path in the frame according to the destination information set in the frame, then transmits the frame to the destination. The starting node of the transfer path decides a target transfer path according to the transfer path selection information set in the frame to transmit the frame to the transfer path while the terminating node of the transfer path decides a target output line according to the output line selection information set in the frame, thereby transmitting the frame to the output line.

In another aspect, the frame transfer method of the present invention forms a virtual line (e.g., a VC path) in the transfer path for each logical network formed in the network, so that a terminal for transmitting a frame or node, which is located outside the transfer path, when transmitting the frame, writes a logical network identifier used to identify a target logical network in the frame, then transmits the frame. On the other hand, the starting node of the transfer path decides a target virtual line (a virtual line and an output line connected to the virtual line) according to the logical network identifier and the transfer path selection information set in the frame while the terminating node of the transfer path decides a target output line to output the frame therefrom according to the logical network identifier and the transfer path selection information set in the frame, thereby transmitting the frame to the output line.

In still another aspect, the frame transfer method of the present invention forms a virtual line (e.g., a VC path) in the transfer path for each logical network formed in the network, so that a terminal for transmitting a frame or node, which is located outside the transfer path, when transmitting the frame, writes a logical network identifier used to identify a target logical network in the frame to transmit the frame. On the other hand, the starting node of the transfer path decides a target virtual line (a virtual line and an output line connected to the virtual line) according to the logical network identifier and the transfer path selection information set in the frame, then writes the virtual line identifier information (e.g., a VC label) used to identify the virtual line in the frame to be transferred while the terminating node of the transfer path decides a target output line to output the frame therefrom according to the virtual line identifier information and the output line selection information set in the frame, thereby enabling transmission of the frame to the output line.

Further, the frame transfer device of the present invention is provided with a plurality of input lines and a plurality of output lines and used to transfer frames inputted to the plurality of input lines to the plurality of output lines. The frame transfer device also includes a frame information transmission unit for transmitting frame information consisting of one or both of the destination address information and the network identifier set in the header of the frame, a transfer table for storing a plurality of transfer entries, each storing destination information consisting of at least one or both of the path selection information and the output line selection information used by a frame transfer device located in the downstream of the frame transfer device in a path connected to a terminal identified by the destination address information to decide the destination of the frame, a header process unit for referring to the transfer table upon receiving the frame information to decide an output line number and destination information corresponding to the destination address information set in the header of the frame, and destination information writing means for writing the destination information in the frame.

In another aspect, the frame transfer device of the present invention, provided with a plurality of input lines and a plurality of output lines and used to output frames inputted from the plurality of input lines to the plurality of output lines, further includes a frame information transmission unit for transmitting frame information to a destination, the frame information consisting of path selection information and network identifier corresponding to the destination address information written by a frame transfer device located in the upstream of the above frame transfer device, a transfer table for storing a plurality of transfer entries, each consisting of an output line number and path information corresponding to the frame information, a header process unit for referring to the transfer table upon receiving of the frame information to decide both of the output line number and the path information, a frame switch for transferring the frame to the output line corresponding to the output line number, and destination information writing means for writing the path information in the frame.

In still another aspect, the frame transfer device of the present invention, provided with a plurality of input lines and a plurality of output lines and used to output frames inputted from the plurality of input lines to the plurality of output lines, further includes a frame information transmission unit for transmitting frame information consisting of one or more of a network identifier, an input line number that is an identifier of the input line to which the frame is inputted, and path information that is an identifier of the path through which the frame is transferred, as well as output line selection information corresponding to the destination address information written by a different frame transfer device located in the upstream of the above frame transfer device; a transfer table for storing a plurality of transfer entries, each consisting of an output line number corresponding to the frame information; a header process unit for referring to the transfer table upon receiving of the frame information to decide a target output line number; and a frame switch for transferring the frame to the line corresponding to the output line number.

In order to solve the above conventional problems, the frame transfer method of the present invention, which is employed for a network consisting of a plurality of nodes and terminals connected to one another through a line, enables a transfer path for transferring frames to be formed between nodes in the network, so that one of the nodes, upon receiving a frame from a different node, writes a path identifier for identifying a target transfer path in the frame and transmits the frame to the destination. A terminal for transmitting a frame or node, which is located outside the transfer path, when transmitting a frame through the transfer path, writes the transfer path information related to the transfer path and the output line information related to an output line from the terminating node of the transfer path in the frame to be transmitted while the starting node of the transfer path decides a target transfer path used for transferring the frame according to the transfer path selection information set in the frame, then transmits the frame to the transfer path according to the destination information set in the frame. And, the terminating node of the transfer path also decides a target output line for outputting the frame therefrom according to the output line information set in the frame, thereby transmitting the frame to the output line.

Concretely, a network that employs the frame transfer method of the present invention controls as follows so as to construct a large scale network that can connect many enterprises (contractors). Concretely, each PE of the backbone network does not learn any such transfer information as an output line number, a tunnel LSP, a VC LSP, etc. corresponding to each MAC address. Instead, a node located in the upstream of the PE adds information equivalent to such the transfer information to transmit each frame. This added information includes a line to which the frame is transferred by a PE located at the inlet of the backbone network, a tunnel SP, VC LSP information, a line to which the frame is transferred by a PE located at the outlet of the backbone network. Each PE transfers frames according to this information.

For example, if a frame is to be transferred from the LAN-B1 terminal T2 to the LAN-B2 terminal T7, the frame will be transferred as follows. The ME located in the upstream of both PE1 and PE3, when receiving a frame, writes two pieces of information in the frame; the information for specifying that the PE1 uses both T-LSP2 and VC-LSP2 in a line connected to the PC2 and the information for specifying that the PE3 uses a line connected to the MAN-3 for transferring the frame. Then, the ME transmits the frame to the destination.

A node required to store information corresponding to each MAC address cannot have so many enterprises (contractors), since it comes to be located at the side of the network edge. This is why such a node is just required to store only the information corresponding to the MAC address of each terminal of those less enterprises. In the above example, the ME2 stores information related to only the terminals of the enterprise B, so that the ME2 comes to store information corresponding to the MAC addresses of the terminals (T2, T5 to T8, and T11). Consequently, the capacity of the table for storing such the information does not prevent the increase of the number of contracted enterprises; the network that employs the present invention will thus be able to cope with many more enterprises (contractors) than any other conventional networks.

DETAILED DESCRIPTION OF THE PREFERRED EMBODIMENT

Next, an preferred embodiment of the present invention will be described with reference to the accompanying drawings.

Figure 1:
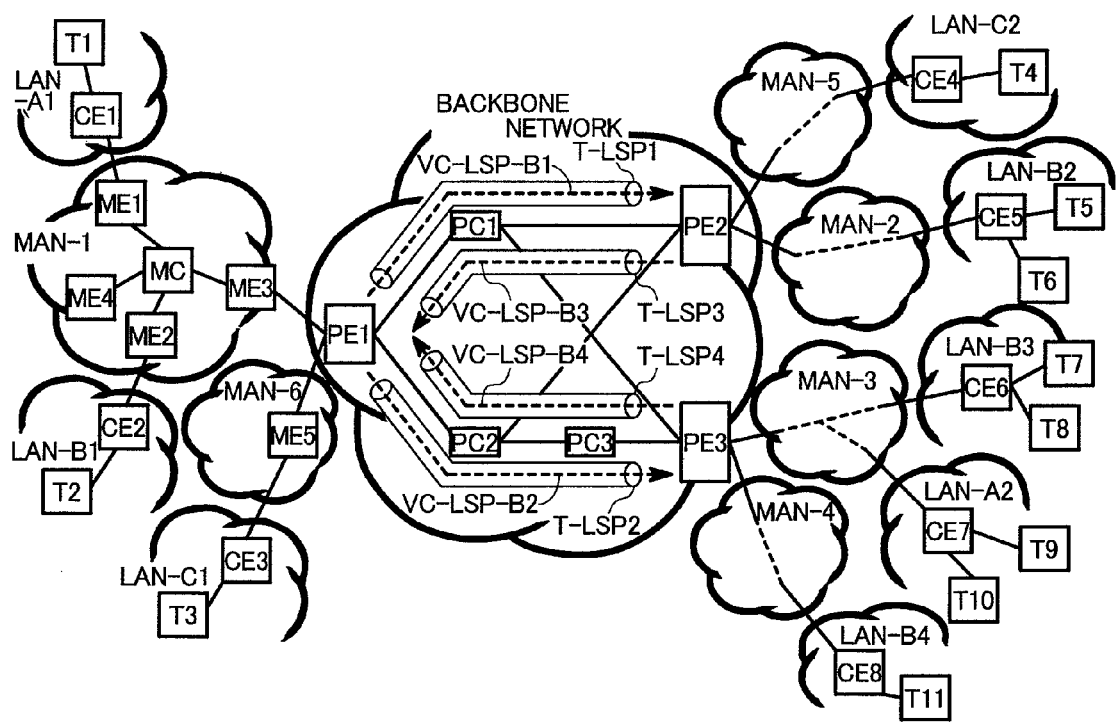
FIG. 1 is a block diagram of a network to which the frame transfer method of the present invention applies.
Figure 2:
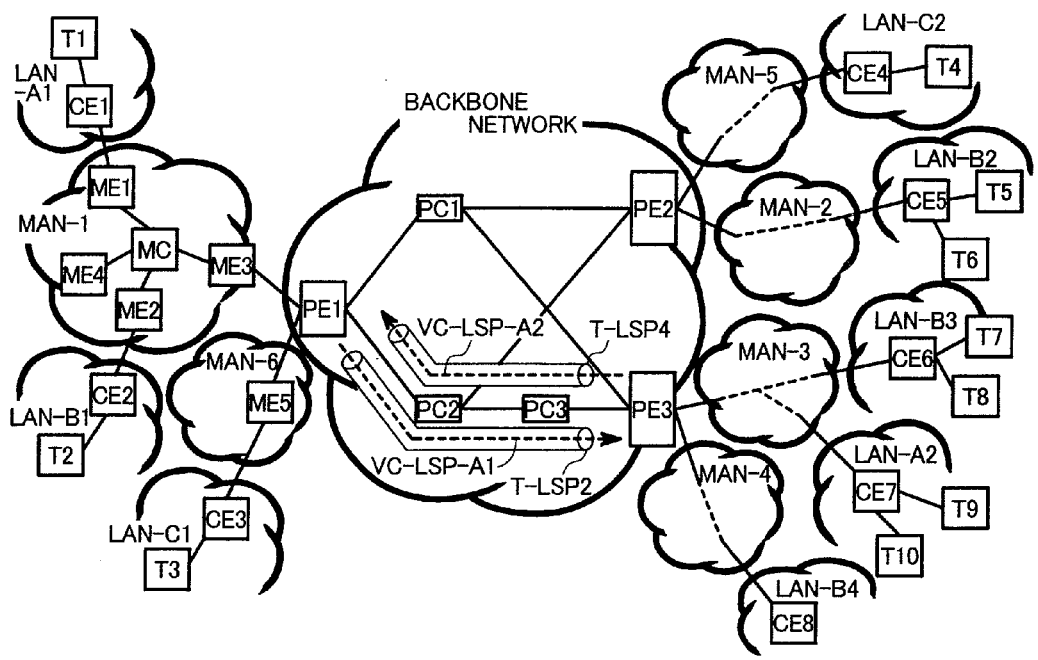
FIG. 2 is a block diagram of a network to which a conventional frame transfer method applies.

FIG. 1 shows a block diagram of a network to which the frame transfer method of the present invention can apply.

The network shown in FIG. 1 realizes VPN-A to C (VPN: Virtual Private Network, A to C: enterprises A to C) in the VPN service. The VPN-A to C are connected to one another through a backbone network and a plurality of MANs (Metropolitan Area Network) 1 to 6. The VPN-A is configured by site LANs (Local Area Network) A1 and A2, the VPN-B is configured by site LANs B1 to B4, and the VPN-C is configured by site LANs C1 and C2 respectively. Each of the LANs is configured by a CE (Customer Edge Node) used to connect the LAN to a MAN and one or more terminals T (T: Terminal). A MAN used to transfer frames between each LAN and the backbone network is configured by an ME (MAN Edge Node) located at the edge and an MC (MAN Core Node) located at the core of the network. The backbone network connected to the MAN is configured by PEs (Provider Edge Nodes) 1 to 3 and PCs (Provider Core Nodes) 1 to 3 located at the core.

In the backbone network are formed a plurality of tunnel LSPs (LSP: Label Switching Path). In each of those tunnel LSPs, a T-LSP1 is formed so as to transfer frames in the direction of PE1->PC1->and PE2 while a T-LSP3 is formed so as to transfer frames in the opposite direction. In addition, a T-LSP2 is formed so as to transfer frames in the direction of PE1->PC2->PC3->PE3 and a T-LSP4 is formed so as to transfer frames in the opposite direction. In the T-LSP1 is formed a VC-LSP-B1, which is used to transfer frames from the LAN-B1 to the LAN-B2, as well as a VC-LSP-B3 used to transfer frames in the opposite direction. And, in the T-LSP2 are formed a VC-LSP-B2 used to transfer frames from the LAN-B1 to the LAN-B3 and B4, as well as a VC-LSP-B4 used to transfer frames in the opposite direction. In the tunnel LSP is also formed some other LSPs used for communications among the sites of the enterprise A, among the sites of the enterprise C, and between PE2 and PE3, although they are not shown here.

When any of the conventional techniques 3 and 4 described above is employed for the backbone network, the PE1 is required to store line numbers, tunnel labels, and VC labels corresponding to the MAC addresses of the terminals T4 to T11, as well as line numbers corresponding to the MAC addresses of the terminals T1 to T3. Concretely, the PE1 of the backbone network is required to learn and store such transfer information as tunnel labels, VC labels, or line numbers corresponding to the MAC addresses of the terminals T1 to T11 of all the contracted enterprises. However, the table provided in the PE to store such the transfer information is limited in capacity. The table thus becomes a bottleneck sometimes in each network that employs any of the conventional techniques 3 and 4, so that it might be impossible to store many contracted enterprises in the table.

On the other hand, in any network that employs the frame transfer method of the present invention, the PE of the backbone network is not required to learn such transfer information as output line numbers, tunnel LSPs, VC LSPs corresponding to the MAC addresses. A node located in the upstream of the PE adds information equivalent to such the transfer information to each frame to be transmitted. This added information consists of such information as line, tunnel LSP, and VC LSP used by the PE located at the inlet of the backbone network, as well as the subject frame that stores information of the line number to which the frame is to be transferred by the PE located at the outlet of the backbone network. Each PE transfers each frame according to this information.

In the frame transfer method of the present invention, each node that stores information corresponding to the MAC address set in each frame is located on the edge of the network. Therefore it does not need to store so many contracted enterprises. Because such the node is just required to store information corresponding to the MAC addresses of not so many terminals of each contracted enterprise, the capacity of the table for storing such the information will thus not prevent the number of contracted enterprises from increasing.

Concretely, when the ME2 transfers a frame to the terminal T7 of the LAN-B3, the ME2 instructs the PE1 to specify lines connected to the PC2, the LSP-B2, and the T-LSP2. The ME2 also instructs the PE3 to specify a line connected to the MAN-3. At this time, the ME2 is just required to store the LSP selection information and the output line selection information as transfer information related to the terminals (T2, T5, T6 to T8, and T11) of the enterprise B; the ME2 is not required to store any transfer information related to the terminals of the enterprises A and C.

Next, a description will be made for the operation of each node when the terminal T2 of LAN-B1 transfers frames addressed to the terminal T7 of LAN-B3 with use of the frame transfer method of the present invention.

Figure 3:
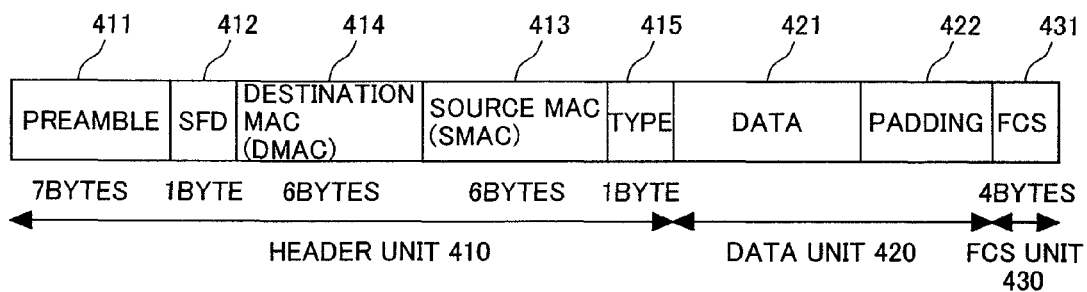
FIG. 3 is a format of the DIX Ethernet frames transmitted by a terminal T2.

FIG. 3 shows a format of DIX Ethernet II frames transmitted by the terminal T2.

The DIX Ethernet II frame format consists of a header part 410, a data part 420, and an FCS part 430.

The header part consists of fields of preamble 411, SFD (Start of Frame Delimiter) 412, source MAC address (SMAC: Source MAC) 413, destination MAC address (DMAC: Destination MAC) 414, and type 415. The preamble field 411 includes information for enabling a frame receiving device to find the start of a frame and the SFD field includes information for denoting the start of the frame. In those fields, hexadecimal values "01010101" and "AB" are set respectively. The SMAC field 413 sets the source address of the frame while the DMAC field 414 sets the destination address of the frame. The type 415 denotes a protocol of the network layer stored in the data part 420. For example, "0800" (HEX) denotes that the received frame is a Novell NetWare frame. The data part 420 consists of fields of data 421 and padding 422. The padding 422 fills the space of the frame so that the frame becomes at least 64 bytes in full data length. The FCS 430 part has an FCS field 431. A device, when receiving a frame, checks this FCS field 431 to decide the validity/invalidity of the frame.

Figure 4:
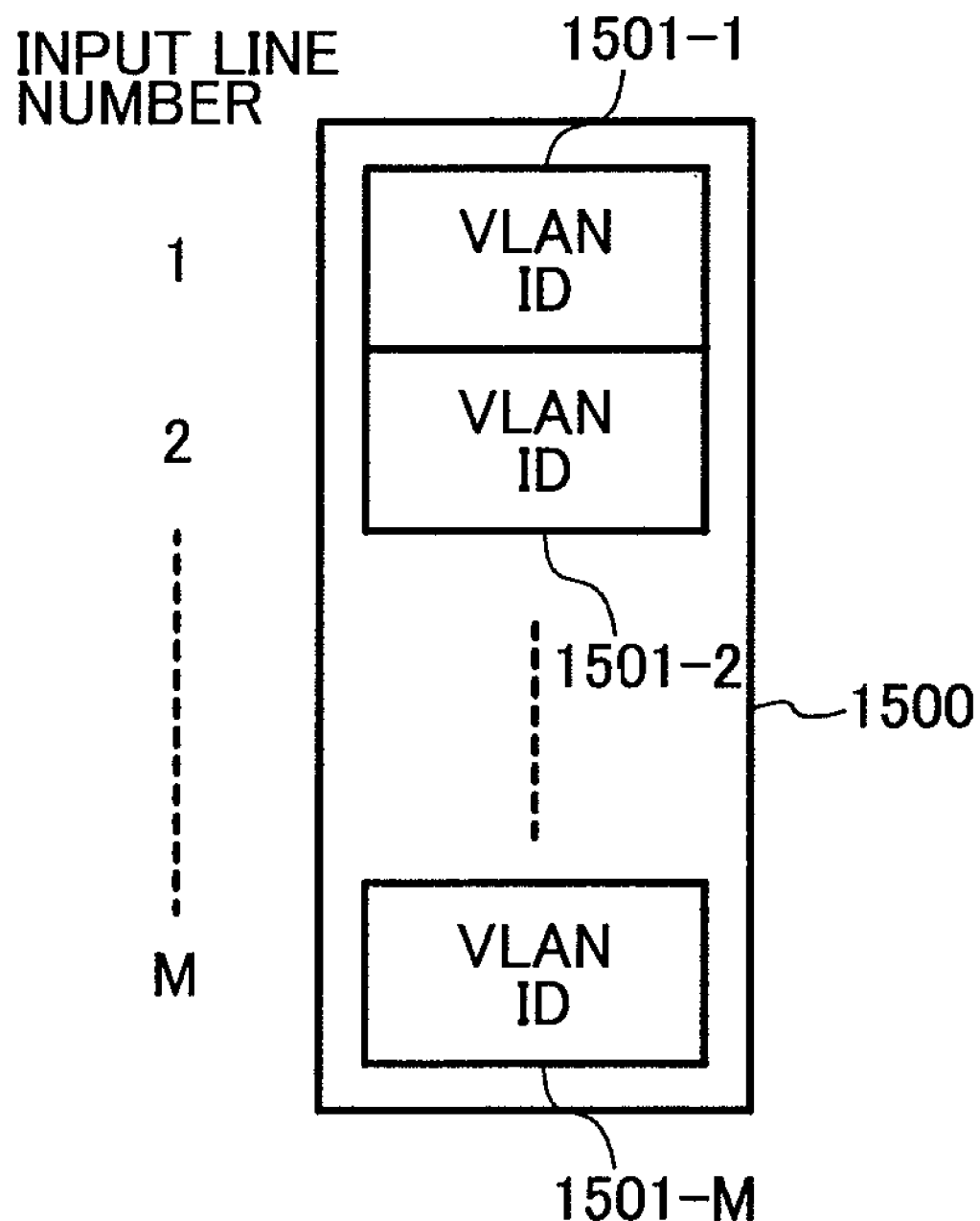
FIG. 4 is a chart for describing a table 1500 formed in a node ME2.

The ME2, when receiving a frame addressed to the terminal T7 from the terminal T2, identifies that the frame belongs to the enterprise B according to the line number of the line (hereinafter, referred to as the input line number), through which the frame is received. This enterprise identification by the ME2 is realized by referring to a table 1500 (FIG. 4) provided in the ME2 to read the VLAN ID 1501-*i* set in each entry therein according to the input line number written in the frame. The table 1500 stores the VLAN ID, which is an enterprise identifier set for each input line number.

Figure 5:
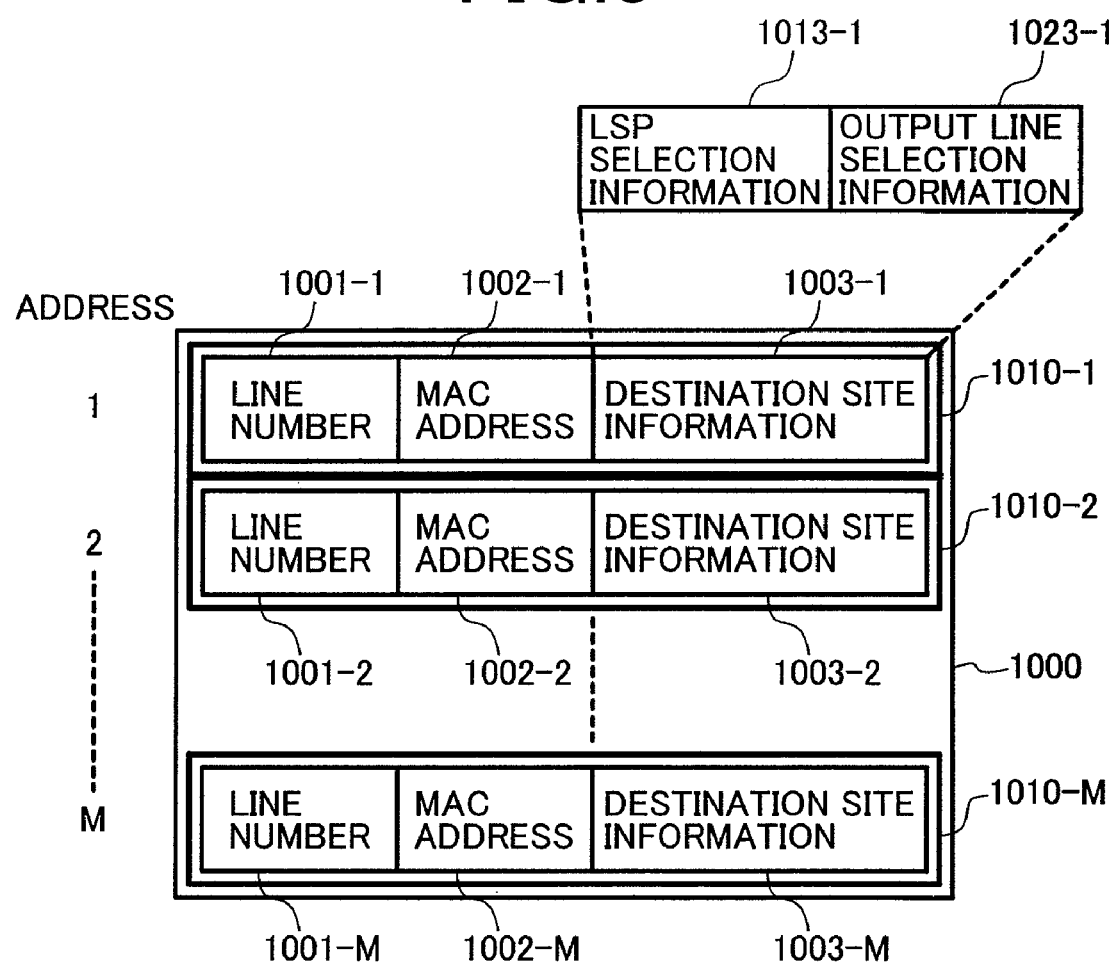
FIG. 5 is a chart for describing a table 1000 formed in a node ME2.

The ME2 then decides a target output line (hereinafter, to be referred to as an output line number) from which the frame is to be output and the destination site information according to the DMAC 414. This decision of the output line number and the destination site information is realized by referring to a table 1000 (FIG. 5) that stores both output line number and destination site information in correspondence with the MAC address of each terminal.

Concretely, the ME2 reads a plurality of entries 1010-*i* one by one from the table 1000 and compares the DMAC 414 set in the header part 410 of the frame with the MAC address 1002-*i* set in each entry to decide the line number 1001-*i* and the destination site information 1003-*i* set in the "matching" entry 1010-*i* as both target line number and destination site information. This destination site information (two bits) consists of single-bit LSP selection information 1013-*i* used to decide a target LSP at the inlet PE1 of the backbone network and single-bit output line selection information 1023-*i* used to decide an output line at the outlet PE3 of the backbone network.

The ME2 then adds a header to the frame and transmits the frame to the MC (MAN Core). The added header includes the destination site information bit for denoting whether or not the destination site information 1003-*i* is valid. The destination site information 1003-*i* consists of determined enterprise information (VLAN ID) and destination site information 1003-*i*. This header may be a VLAN Tag described in the IEEE 802.1Q.

Figure 6:
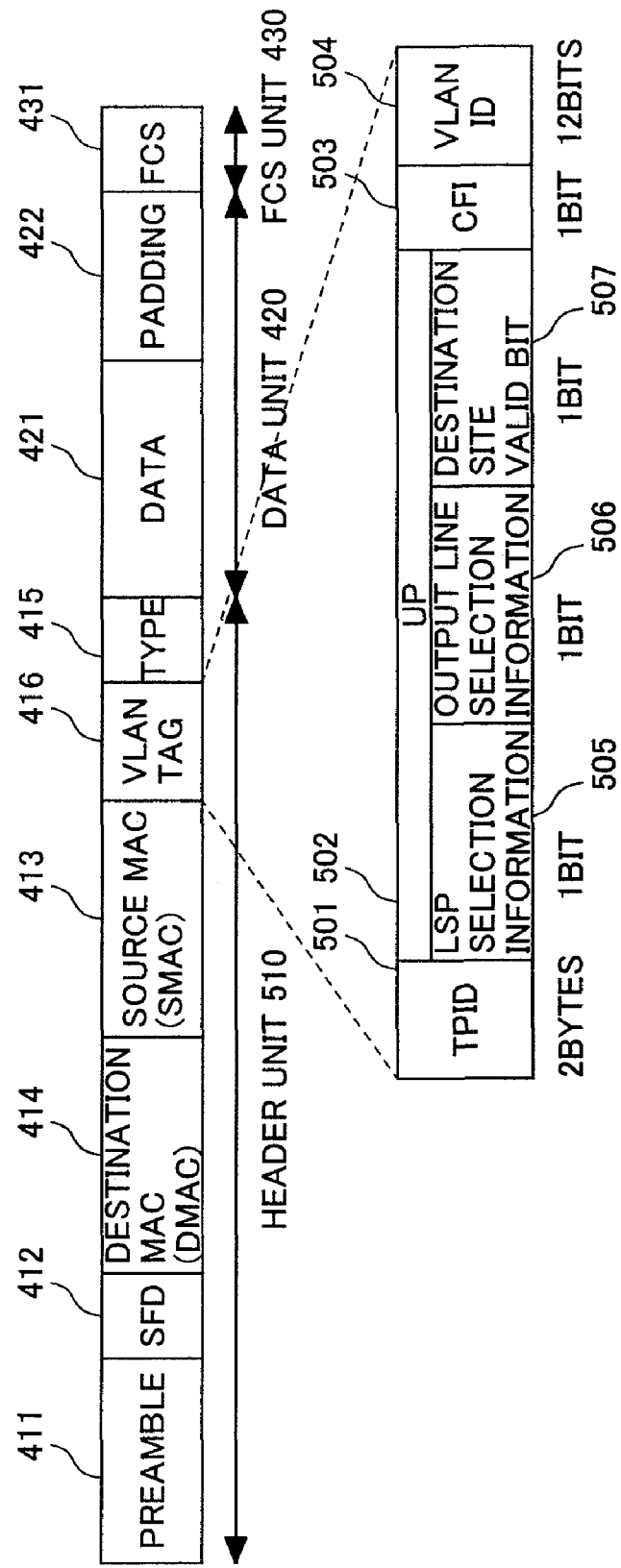
FIG. 6 is a format of frames handled in a MAN.

FIG. 6 shows a format of frames transmitted from the ME2 and handled in the MAN-1 after a VLAN Tag is added to each of the frames. In the frame format shown in FIG. 6, a VLAN Tag 416 is inserted between the SMAC 413 and the type 415 in the header part in the frame format shown in FIG. 3.

The TPID (Tag Protocol Identifier) 501 set in the VLAN Tag 416 is used for the Token Ring, FDDI, etc. When it is used by the Ethernet (trademark), it is represented as "8100" in hexadecimal. The CFI (Canonical Format Indicator) 503 is single-bit information used for the Token Ring communication. The UP (User Priority) 502 is 3-bit information denoting a transfer priority level. In this embodiment, this UP 502 is used as LSP selection information 505 (1 bit) for storing LSP selection information, the output line selection information 506 (1 bit) for storing output line selection information, and the destination site information bit 507 for denoting valid/invalid of both of the LSP selection information 505 and the output line selection information 506 (1 bit). The VLAN ID 504 is an identifier of a VLAN (Virtual LAN). In this embodiment, it is used as an enterprise (VPN) identifier. The PE1 writes the LSP selection information 1013-*i*, the output line selection information 1023-*i*, and "1" (valid) in the LSP selection information 505, the output line selection information 506, and the destination site information bit 507 of the UP 502 respectively and writes the VLAN ID 1501 corresponding to the enterprise B in the VLAN ID 504.

The terminals T2 or CE2 may be configured so that the information of the enterprise B is written in the VLAN ID 504 of the VLAN Tag 416 in each frame to be transmitted. In this connection, the ME2 adds none of the enterprise identifier and the VLAN Tag 416 to the frame.

Figure 7:
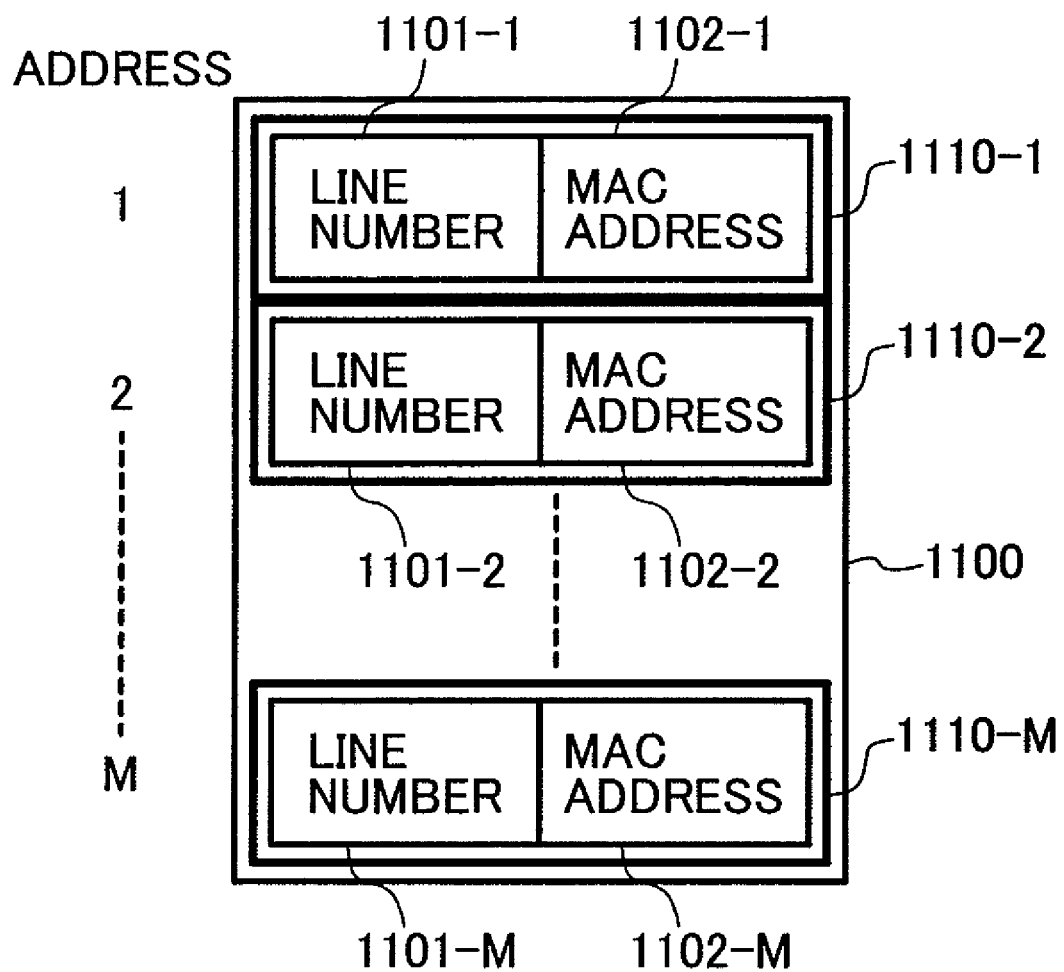
FIG. 7 is a chart for describing a table 1100 formed in a node MC.

The MC in the MAN-1, when receiving such a frame, decides a target output line number according to the DMAC 414 set in the frame and transfers the frame to the output line. The ME3 transfers frames similarly. Such the output line decision by the MC or ME3 is realized by referring to a table 1100 (FIG. 7) that stores a plurality of entries 1100-*i*, each storing a line number 1101-*i* and a MAC address 1102-*i*. The MC or ME3 reads those entries 1110-*i* one by one from the table 1100 and compares the MAC address 1102-*i* in each of the entries 1110-*i* with the DMAC 414 set in the header part 510 to decide the line number 1101-*i* in the "matching" entry 1110-*i* as the target output line number.

The PE1, when receiving a frame through the MC or ME3, identifies the enterprise to which the frame belongs according to the VLAN ID 504 set in the header part 510 in the frame to decide that it is the enterprise B. Then, the PE1 decides one or more sets, each consisting of an output line number, a VC LSP, and a tunnel LSP. The PE1 also selects one of those sets according to the LSP selection information 505 set in the UP 502 of the header part 510. In this embodiment, the PE1 selects the set 1 consisting of the line numbers of the lines to the PC2, a VC-LSP-B2, and the T-LSP2, as well as the set 2 consisting of line numbers of the lines to the PC1, the VC-LSP-B1, and the T-LSP1 according to the VLAN ID 504, then decides the set 1 according to the LSP selection information 505 as the information used for transferring the frame.

Figure 8:
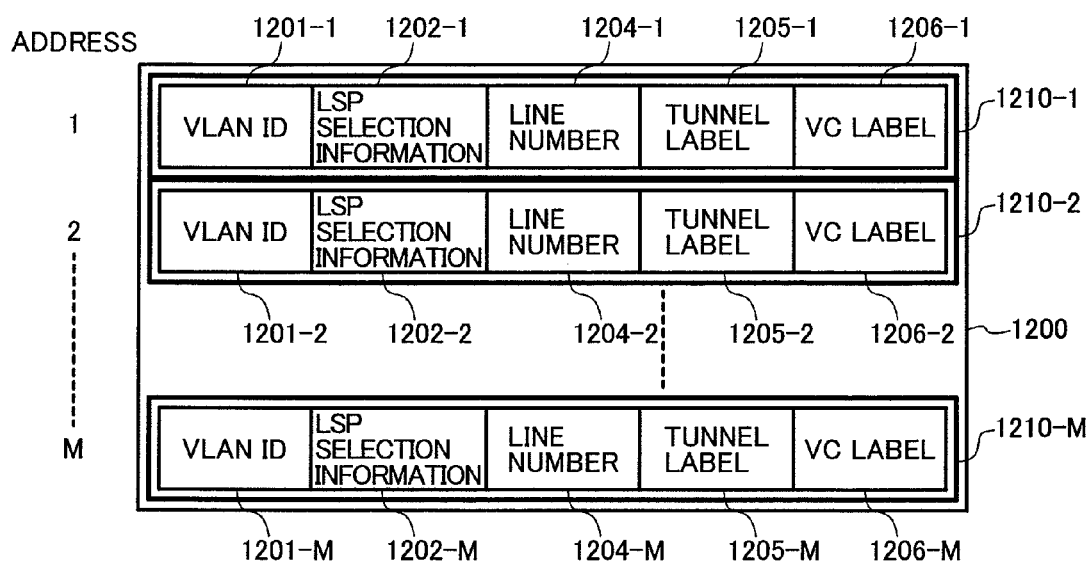
FIG. 8 is a chart for describing a table 1200 formed in a node PE1.

This decision is realized by, for example, referring to a table 1200 (FIG. 8) that stores a plurality of entries 1210-*i*. The PE1 reads those entries 1210-*i* one by one from the table 1200 and compares the information written in the frame with that set in each entry so that the VLAN ID 504 set in the header part 510 of the frame is compared with the VLAN ID 1201-*i* set in each entry 1210-*i* and the LSP selection information 505 set in the header part 510 of the frame is compared with the LSP selection information 1202-*i* set in each entry respectively. The PE1 then decides the line number 1204-*i* as the target output line number, the tunnel label 1205-*i* as the target tunnel label and the VC label 1206-*i* as the target VC label, set in the "matching" entry 1210-*i* respectively.

The PE1 then adds the values of both tunnel label 1205-*i* and VC label 1206-*i* to the frame to be transmitted to the backbone network.

Figure 9:
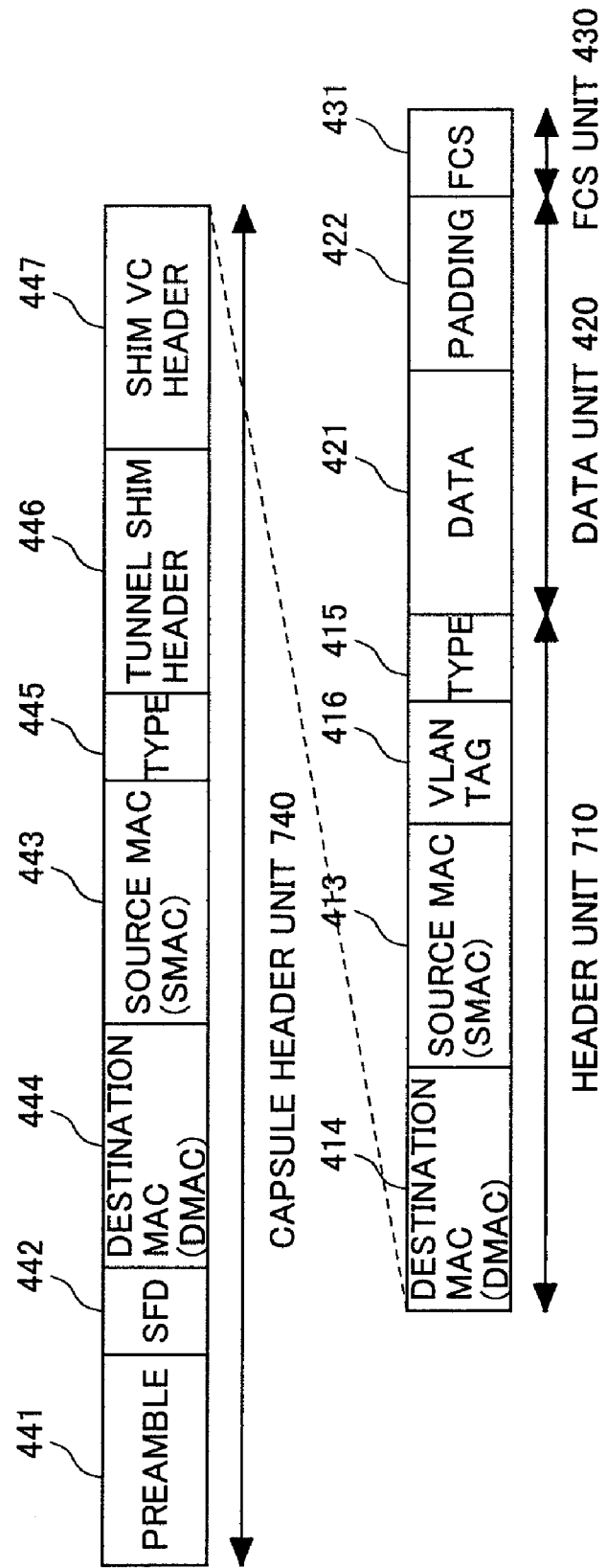
FIG. 9 is a format of frames handled in a backbone network.

FIG. 9 shows a format of the frames handled in the backbone network, transmitted by the PE1 after the header information related to both tunnel label and VC label are added to each of the frames.

In the frame format shown in FIG. 9, a capsule header part 740 is added to the frame and the fields of the preamble 411 and the SFD 412 are deleted from the header part 510 of the frame format shown in FIG. 6, thereby forming the new header part 710. The capsule header part 740 consists of the same fields 441 to 445 as those of the header part 510 (FIG. 6), as well as a tunnel shim header 446, and a VC shim header 447.

Figure 10:
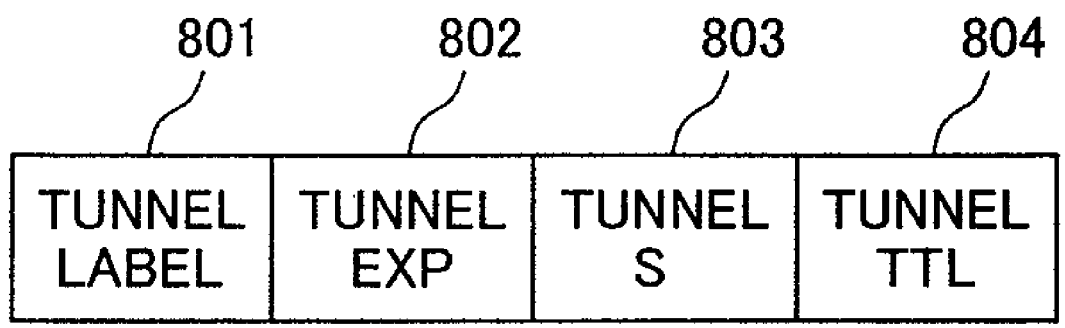
FIG. 10 is a format of a tunnel shim header 446.
Figure 11:
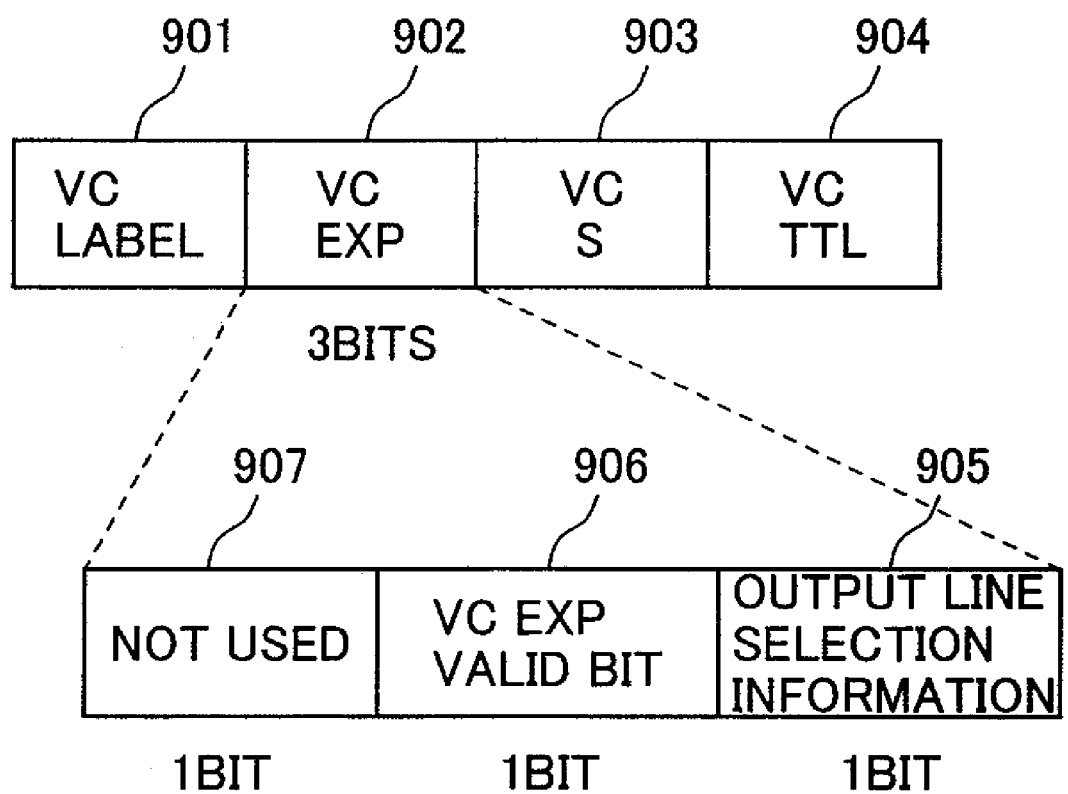
FIG. 11 is a format of a VC shim header 447.

FIG. 10 shows the tunnel shim header 446 formatted as described in the RFC 3032 and FIG. 11 shows the VC shim header 447 formatted as described in the RFC 3032.

The tunnel shim header 446 consists of fields of tunnel label 801, experimental tunnel EXP 802, tunnel S bit 803, and tunnel TTL (Time to Live) 804.

Similarly, the VC shim header 446 consists of fields of VC label 901, 3-bit VC EXP 902, VC S bit 903, and VC TTL 904. In this embodiment, the lower one bit of the VC EXP 902 is used for the output line selection information 905 and the upper second bit is used for the VC EXP information bit 906 to be set for denoting valid/invalid of the output line selection information 905. The MSB 907 is not used. The PE1 stores the information of the tunnel label 1205-*i* and the VC label 1206-*i* decided above in the tunnel label 801 and in the VC label 901 respectively.

Finally, the PE1 writes the value of the output line selection information 506 (one bit) of the UP 502 in the output line selection information 905 of the VC EXP 902 so as to notify the PE3 of the output line selection information, then writes "1" (valid) in the VC EXP information bit 906. After this, the PE1 transmits the frame to the line corresponding to the line number 1204-*i*.

The PC2 transfers the frame to the PC3 according to the tunnel label 801, then updates the tunnel label 801. Similarly, the PC3 transfers the frame to the PC3 according to the tunnel label 801. The PC3 may delete the tunnel shim header 446 at this time. When the header 446 is deleted, transmission of unnecessary information is prevented, thereby the network band can be used more efficiently.

The PE3, when receiving this frame, identifies the enterprise to which the frame belongs according to both the input line number and the VC label 901 to decide one or more target line numbers (a line to MAN-3 and a line to MAN-4 in this embodiment). The PE3 also decides the line number of the line to MAN-3 as the target output line number according to the output line selection information 905 set in the VC EXP 902.

The output line decision by the PE3 is realized by referring to a table 2400 (FIG. 12) that stores a plurality of entries 2410-*i*, each storing an input line number 2401-*i*, a VC label 2402-*i*, a VC EXP 2403-*i*, and an output line number 2404-*i*. Concretely, the PE3 reads those entries 2410-*i* one by one from the table 2400 and compares the information written in the frame with that set in each entry 2410-*i* so that the input line number in the frame is compared with the input line number set in each read entry 2410-*i* and the VC label 901 set in the capsule header part 740 of the frame with the VC label 2402-*i* set in each entry, the output line selection information 905 set in the VC EXP 902 of the frame is compared with the output line selection information 2406-*i* set in the VC EXP 3403-*i* in each entry 2410-*i* to decide the output line number 2404-*i* in the "matching" entry as the target output line number.

The 3-bit VC EXP 2403-*i* consists of the output line selection information 2406-*i* (1 bit), the VC EXP information bit 2407-*i* (1 bit) denoting valid/invalid of the VC EXP 2403-*i*, a non-used bit 2408-*i* (1 bit). The value in this VC EXP information bit 2407-*i* is fixed at "1".

After this, the PE3 deletes the capsule header part 740 (FIG. 9) from the frame and adds the preamble 411 and the SFD 412 to the header part of the frame, thereby the frame is formatted as shown in FIG. 6 and the frame is transmitted to the line corresponding to the output line number 2404-*i*.

Each node in the MAN-3 decides the target output line number according to the DMAC 414 set in the header part 510 to transfer the frame to the LAN-B3 similarly to the MC in the MAN-1.

As described above, because both PE1 and PE3 are not required to store information corresponding to the MAC address of each terminal, the table for storing such the information will not prevent the network from expanding in scale.

The information corresponding to the MAC address of each terminal may be set in the tables 1000 and 1100 from the administration terminal connected to each node. When there are many terminals T and such terminals T are often added/deleted to/from the network, such the information should be set in the tables 1000 and 1100 automatically. This auto setting of such the information is realized by making each node perform flooding, notifying, and learning operations. Hereinafter, these three operations will be described.

[Flooding]

If no entry 1010-*i* is set in the table 1000 (FIG. 5) formed in the ME2 nor in the table 1100 (FIG. 7) formed in the MC in correspondence with the DMAC 414 set in a frame transmitted from the T2 to the ME2, each node in the network transmits the frame to all the terminals T of the same contractor (which, in the present embodiment, refers to an enterprise to which same VLAN ID is assigned).

Figure 13:
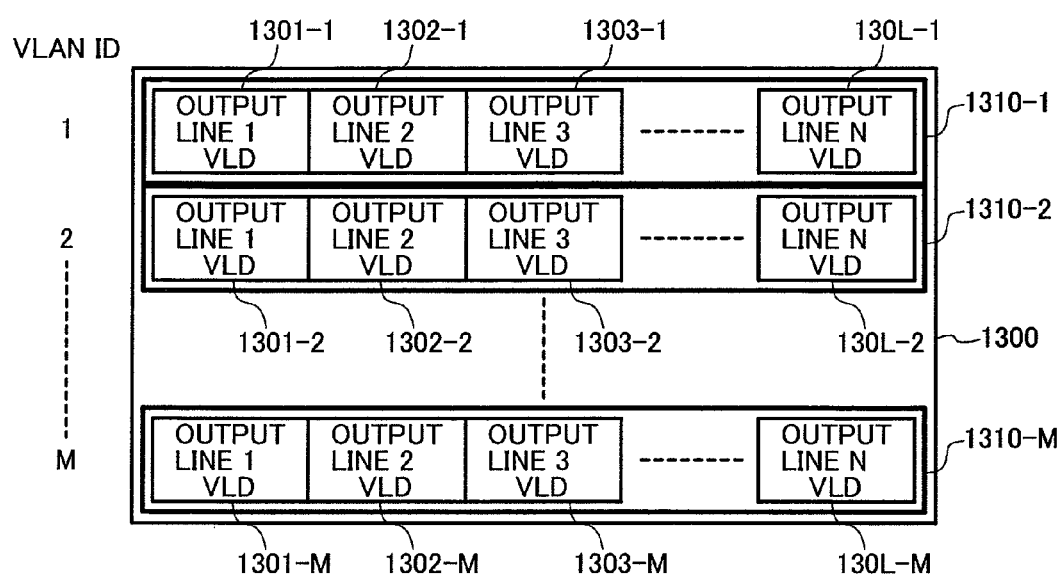
FIG. 13 is a chart for describing a table 1300 formed in each of nodes MC and ME2.

Each node in a MAN decides one or more output line numbers to which the frame is to be transmitted according to the VLAN ID. Here, the MC in the MAN-1 is picked up as an example. Because only the LAN-A1 and the LAN-B1 are connected to the MAN-1, the MC is just required to transmit the frames of enterprises A and B; it is not required to transmit the frames of the enterprise C. To transfer a frame of the enterprise A, therefore, the MC sets a line number connected to the ME1 for transferring the frame to the LAN-A1 and a line number connected to the ME3 for transferring the frame to the LAN-A2 according to the VLAN-A2 of the enterprise A respectively. Similarly, to transfer a frame of the enterprise B, the MC sets a line number connected to the ME2 for transferring the frame to the LAN-B1 and a line number connected to the ME3 for transferring the frame to the LAN-B2 and LAN-B3 according to the VLAN ID of the enterprise B respectively. And, to realize such the operations, the MC refers to a table 1300 (FIG. 13). The table 1300 is used for flooding operation and provided with a bit map 1310-*i* prepared for each VLAN ID. Frame output YES/NO information is set in the output line VLDj field 130*j*-*i* located in the bit map 1310-*i* with respect to each output line j.

At first, the flooding operation of the ME2 will be described. The ME2, when receiving a frame from the terminal T2, refer to the above table 1500 ((FIG. 4) that stores a VLAN ID, which is an enterprise identifier, in correspondence with each input line number) to decide the VLAN ID. Then, the ME2 refer to the table 1000 ((FIG. 5) that stores both output line number and destination site information in correspondence with each MAC address). When the table 1000 includes no entry 1010-*i* corresponding to the DMAC 414 set in the frame, the ME2 reads the bit map 1310-*i* from the table 1300, corresponding to the VLAN ID of the enterprise B so as to perform a flooding operation. This bit map 1310-*i* stores data set so as to output the frame to a line connected to the MC and a line to the CE2 according to the VLAN ID of the enterprise B respectively. However, because there is no need to transmit the frame to the input line at this time, the ME2 decides that only the line to the MC is the target output line. And, because the ME2 cannot obtain no destination site information at this time, the ME2 writes "0" (invalid) in the destination site information bit 502, then transmits the frame to the MC.

Next, the flooding operation by the MC will be described. The MC, when receiving a frame from the terminal T2, refer to the table 1100 ((FIG. 7) that stores a MAC address set in correspondence with each line number) similarly to the ME2. When the table 1100 includes no entry 1110 corresponding to the DMAC 414, the MC reads the bit map 1310-*i* from the table 1100, corresponding to the VLAN ID 504 of the enterprise so as to perform the flooding operation. Because no terminal of the enterprise B is connected to any of the ME1 and the ME4, this bit map 1310-*i* stores data needed to output the frame just to a line to the ME2 and a line to the ME3 according to the VLAN ID of the enterprise B. However, because there is no need to transmit the frame to the input line here, the MC decides that only the line to the ME3 is the target output line and transmits the frame to the ME3.

The ME3, when receiving a frame from the terminal T2, also performs the flooding operation similarly.

Next, the flooding operation by the PE1 will be described. The PE1, when receiving a frame from the terminal T2, identifies "0" (invalid) set in the destination site information bit 507 of the UP 502, thereby the PE1 performs a flooding operation. In this flooding operation, the PE1 transfers a copy of the frame to each of the output lines and LSPs connected to the sites of the target enterprise (enterprise B in this example). This decision of all the output lines and LSPs by the PE1 is realized by, for example, masking the LSP selection information 1202-i (regardless whether or not the "matching" is detected with respect to LSP selection information 1202-i) and referring to a table 1200 ((FIG. 8) that stores a plurality of entries, each storing a line number, a tunnel label, and a VC label). Concretely, the PE1 reads those entries 1210-i one by one from the table 1200 and compares the information written in the frame with that set in each entry so that the VLAN ID 504 set in the header part 510 of the frame is compared with the VLAN ID 1201-i set in each entry. The PE1 decides so that the frame is transmitted to the output line and the LSP specified by a set of a line number 1204-i, a tunnel label 1205-i, and a VC label 1206-i set in every VLAN-ID-matching entry 1210-i, thereby transferring the frame to the decided output line. At this time, the PE1 writes "0" (invalid) in the VC EXP information bit 906 of the VC EXP 902.

Next, the flooding operation by the PE3 will be described. The PE3, when receiving a frame in which the VC EXP information bit 906 "0" is set in the VC EXP field 902, begins a flooding operation. In this flooding operation, the PE3 identifies the enterprise to which the frame belongs according to the input line number and the VC label 901 set in the frame and decides one or more target output line numbers, then transmits a copy of the frame to all the lines corresponding to those output line numbers.

For example, this decision of the target output line numbers is realized by referring to the table 2400 ((FIG. 12) that stores a plurality of entries, each storing an output line number) by masking the VC EXP 2403-i (regardless whether or not "matching" is detected with respect to the VC EXP 2403-i). Concretely, the PE3 reads those entries 2410-i one by one from the table 2400 to compare the information written in the frame with that set in each entry 2410-i so that the input line number written in the frame is compared with the input line number 2401-i in each entry and the VC label 901 set in the capsule header part 740 of the frame is compared with the VC label 2402-i set in each entry. The PE3 then decides the output line numbers 2404-i set in all the VC-label-"matching" entries 2401-i (line numbers of the lines to MAN-3 and MAN-4 in this embodiment) as the target output line numbers and transfer the frame to all the decided lines.

[Notifying Operation]

Next, the notifying operation for notifying the object of destination site information will be described.

The PE3, when transferring a frame addressed to the terminal T7 to the terminal T2, writes the output line selection information used to transfer the frame to the terminal T7 in the frame. The ME2 stores this output line selection information corresponding to the MAC address of the terminal T7 through a learning operation to be described later.

For example, the decision of this output line selection information is realized by referring to the table 2400 ((FIG. 12) that stores a plurality of entries 2410-i, each storing an output line number). Concretely, the PE3 reads those entries 2410-i one by one from the table 2400 to compare the information written in the frame with that set in each entry 2410-i so that the input line number written in the frame is compared with the input line number 2401-i set in each entry, the VC label corresponding to the VC-LSP-B2 used for the frame transfer in the opposite direction of the VC-LSP-B4 is compared with the VC label 2402-i set in each entry, and the output line number used for the frame transfer is compared with the input line number 2401-i set in each entry to write the output line selection information 2406-i obtained from the "matching" entry 2410-i in the output line selection information field 506 of the UP 502 of the frame.

On the other hand, the PE1, when transferring a frame addressed to the terminal T7 to the terminal T2, writes the LSP selection information used for the frame transfer (LSP selection information corresponding to the line number of a line connected to PC2, T-LSP2 and VC-LSP-B2) in the frame to be transferred to the terminal T2 through the terminal T7. The ME2 stores this LSP selection information in correspondence with the MAC address of the terminal T7 through a learning operation to be described later.

Figure 12:
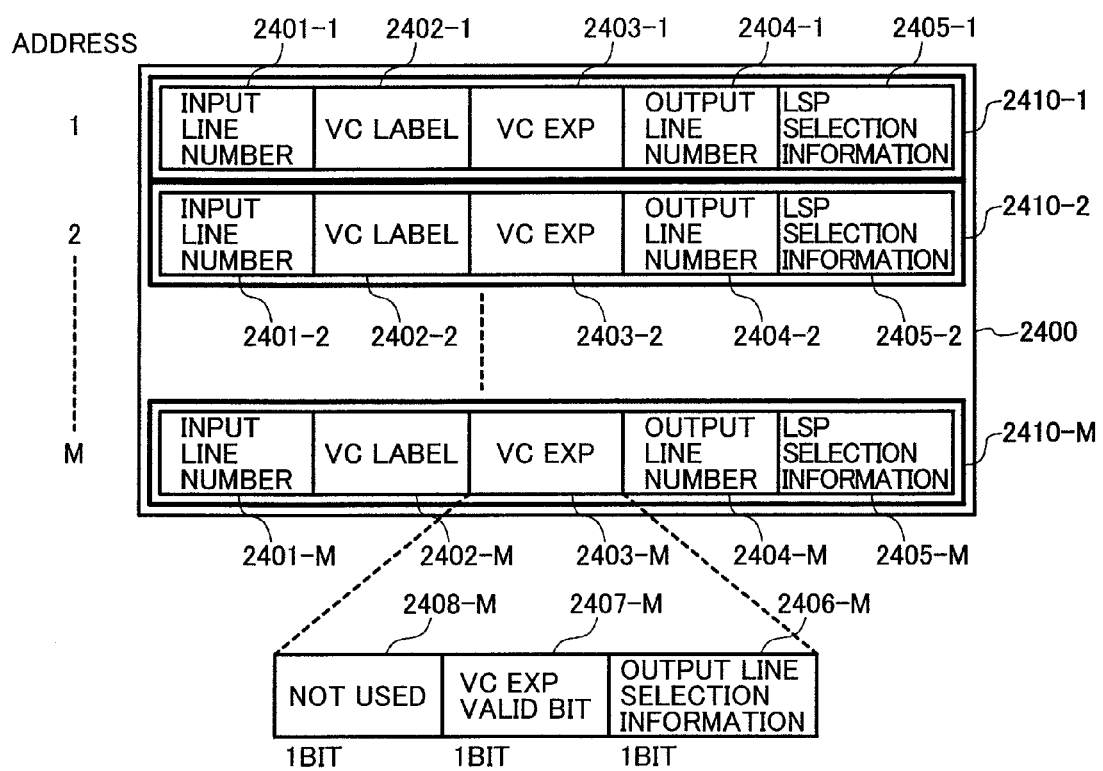
FIG. 12 is a chart for describing a table 2400 formed in a node PE3.

The decision of this LSP selection information is realized, for example, by referring to the table 2400 (FIG. 12). Concretely, the PE1 reads those entries 2410-i one by one from the table 2400 to compare the information written in the frame with that set in each entry 2410-i so that the input line number written in the frame is compared with the output line number 2404-i set in each entry and the VC label corresponding to the VC-LSP-B2 is compared with the VC label 2402-i set in each entry, then writes the LSP selection information 2405-i (1 bit) obtained from the "matching" entry in the LSP selection information 506 field of the frame.

[Learning Operation]

It should be avoided to always perform a flooding operation. Otherwise, the line bandwidth cannot be used efficiently. The MC thus performs a learning operation so as to store an input line number corresponding to the source MAC address set in each inputted frame. On the other hand, the ME performs a learning operation so as to store destination site information notified by the above notifying operation.

The MC, when receiving a frame, reads the entries 1110-i one by one from the table 1100 (FIG. 7)) that stores a MAC address in correspondence with each line number) to compare the information written in the frame with that set in each entry 1110-i so that the input line number written in the frame is compared with the line number 1101-i set in each entry and the SMAC 413 written in the frame is compared with the MAC address 1102-i set in each entry. When there is no "matching" entry 1110-i found in the comparison, the MC registers the input line number and the SMAC 414 written in the frame as new items 1101-i and 1102-i in an entry 1110-i to be set in the table 1100.

Similarly, the ME2, when receiving a frame from the MC, reads the entries 1010-i one by one from the table 1000 ((FIG. 5)) that stores both output line number and destination site information in correspondence with each MAC address) to compare the information written in the frame with that set in each entry 1010-i so that the input line number in the frame is compared with the line number 1001-i set in each entry, the SMAC 413 written in the frame is compared with the MAC address 1002-i set in each entry, the LSP selection information 505 written by the PE1 and output line selection information 506 written by the PE3 in the frame are compared with LSP selection information 1013-i and output line selection information 1023-i in the destination site information 1003-i set in each entry. And, when there is no "matching" entry 1010-i found in the comparison, the ME2 writes the items input line number of the frame, 413, 506, and 505 specified in the frame as a line number 1001-*i*, a MAC address 1002-*i*, output line selection information 1023-*i*, and LSP selection information 1013-*i* that are all set in an entry 1010-*i* to be registered in the table 1000. The PE in the backbone network is not required to transfer any frame according to the DMAC 414, so that it does not perform such the learning operation.

Figure 14:
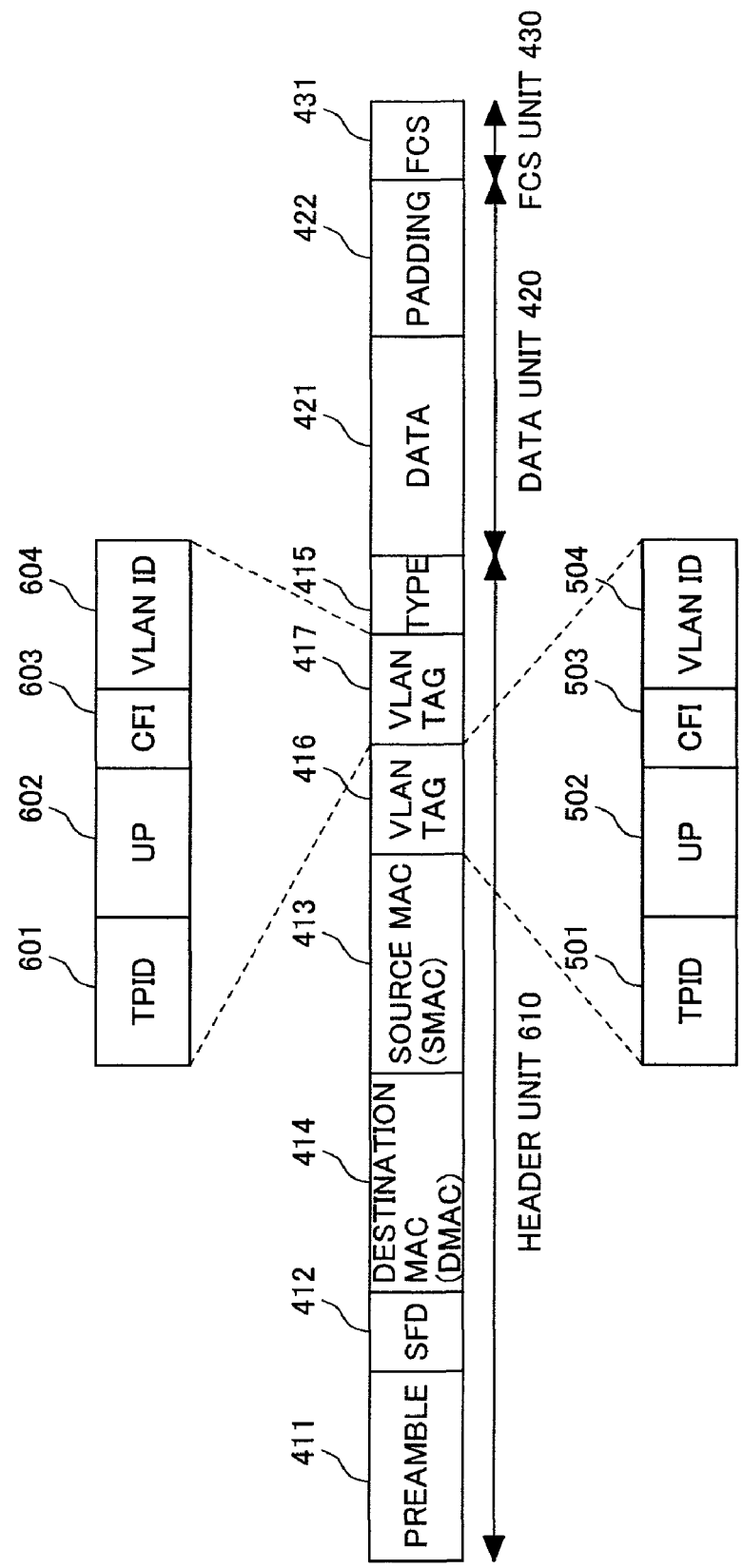
FIG. 14 is a format of frames handled in a MAN.

While a description has been made for a case in which the ME2 maps destination site information in the UP 502 and the PE1 maps output line selection information in the VC EXP 902, the fields of the UP 502 and VC EXP 902 might come to be too small in capacity to map destination site information and output line selection information as described above when the subject enterprise has many sites connected over many MANs. This is because the UP 502 and the VC EXP 902 are as small as 3 bits in length. In such a case, the ME2 can add one more VLAN Tag and write destination site information (LSP selection information and output line selection information) in this VLAN ID 604 (12 bits). FIG. 14 shows such a format of the frames to be transmitted from the ME2. Unlike the frame format shown in FIG. 6, the frame format shown in FIG. 14 has a plurality of VLAN Tags 416 and 417. In FIG. 14, the VLAN Tag 417 is a new field added as described above.

Figure 15:
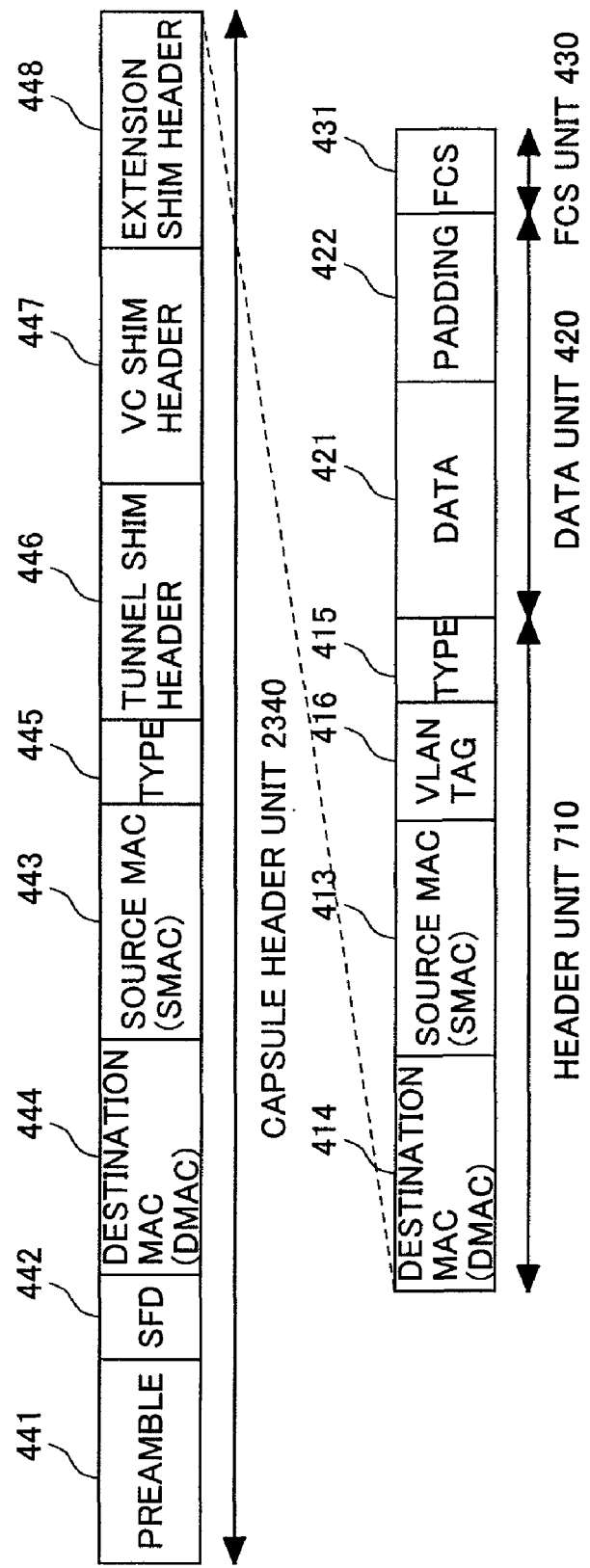
FIG. 15 is a format of frames handled in the backbone network.

Similarly, the PE1 can add one more shim header to the frame so as to write output line selection information therein. FIG. 15 shows such a format of the frames to be transmitted from the PE1. Unlike the frame format shown in FIG. 9, the frame format shown in FIG. 15 has three shim headers. In other words, an extension shim header 448 is newly added to the frame format.

Each node in the network operates in correspondence with such the header configuration.

[Node: ME]

Figure 16:
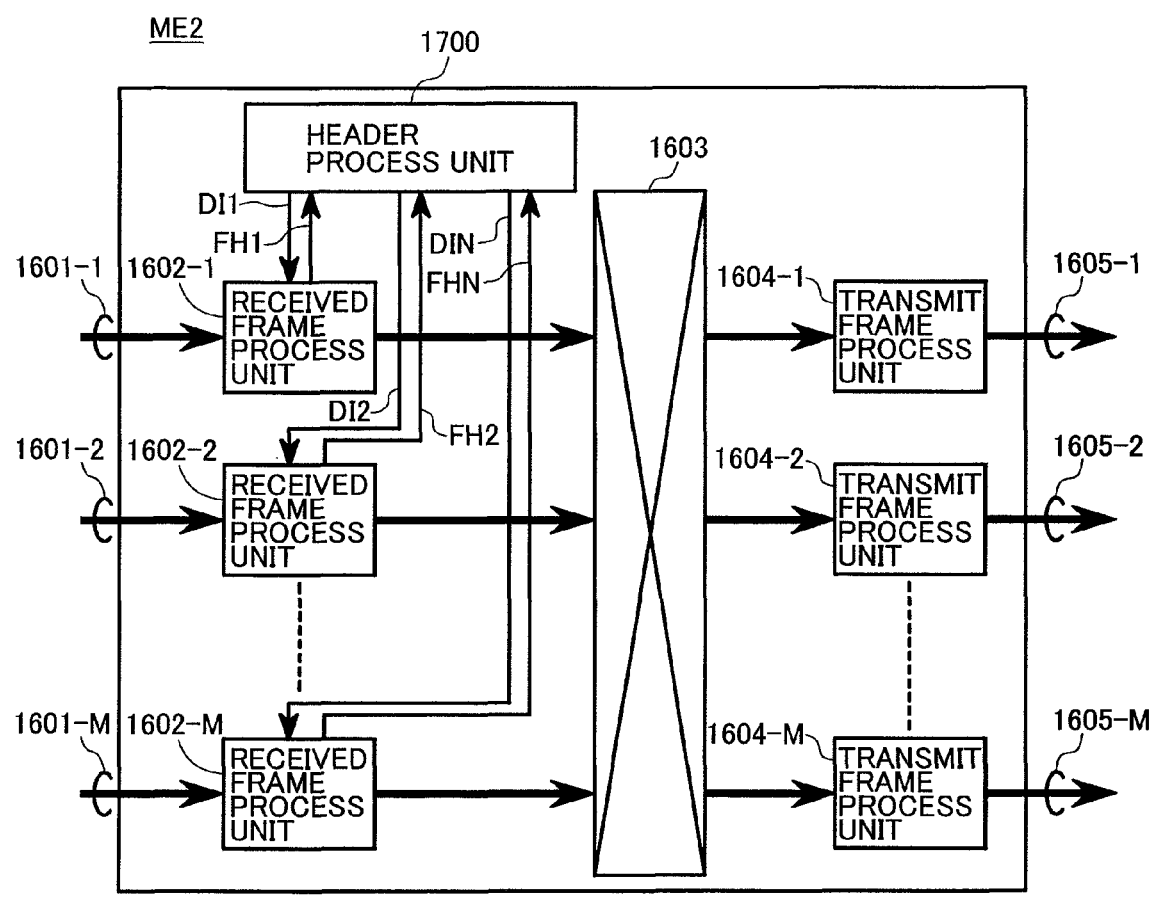
FIG. 16 is a block diagram of a major portion of the node ME2.
Figure 17:
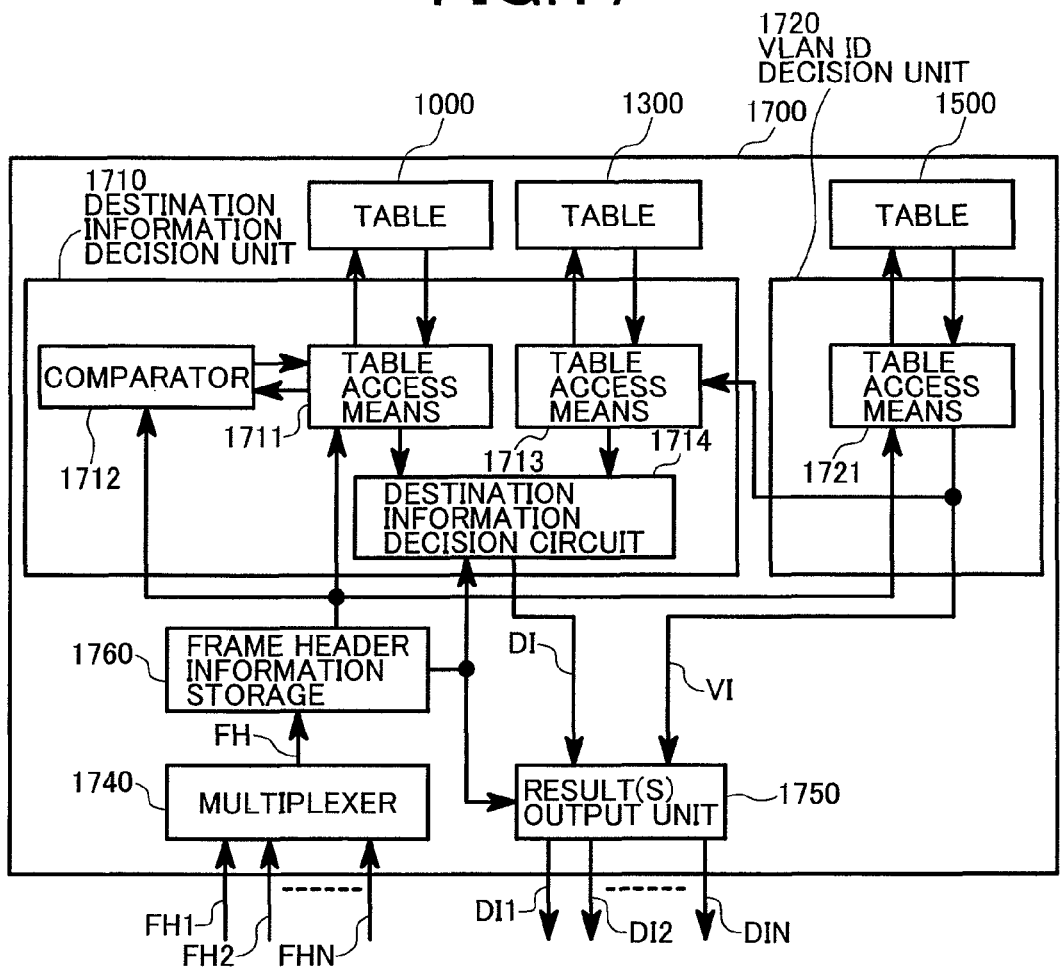
FIG. 17 is a block diagram of a header process unit 1700 provided in the ME2.

Next, a description will be made for the operation by the ME used in a network of the present invention with reference to FIGS. 16 and 17. FIG. 16 shows a block diagram of a major portion of the ME2. FIG. 17 shows a block diagram of a header process unit 1700.

In the embodiment to be described below, the LAN-B1 terminal T2 transfers frames to the LAN-B3 terminal T7 and performs the flooding operation.

As shown in FIG. 16, the ME2 is configured by a received frame process unit 1602-*j* provided to cope with a plurality of input lines 1601-*j* (j=1 to M) to which frames are inputted, a transmit frame process unit 1604-*j* provided to cope with a plurality of output lines 1605-*j* (j=1 to M) from which frames are output, a header process unit 1700 used to process the header part of each inputted frame, and a frame switch 1603 used to switch frames among output lines. This header process unit 1700 analyzes the header of each frame to decide the frame input enterprise (VLAN ID), the output line number, and the destination site information. The frame switch 1603 switches frames among output lines according to the output line number decided by the header process unit 1700.

[Transfer and Flooding Operations by ME2]

At first, a description will be made for a case in which the ME2 receives a frame from the LAN-B1 CE2, then transmits the frame to the MC.

Figure 18:
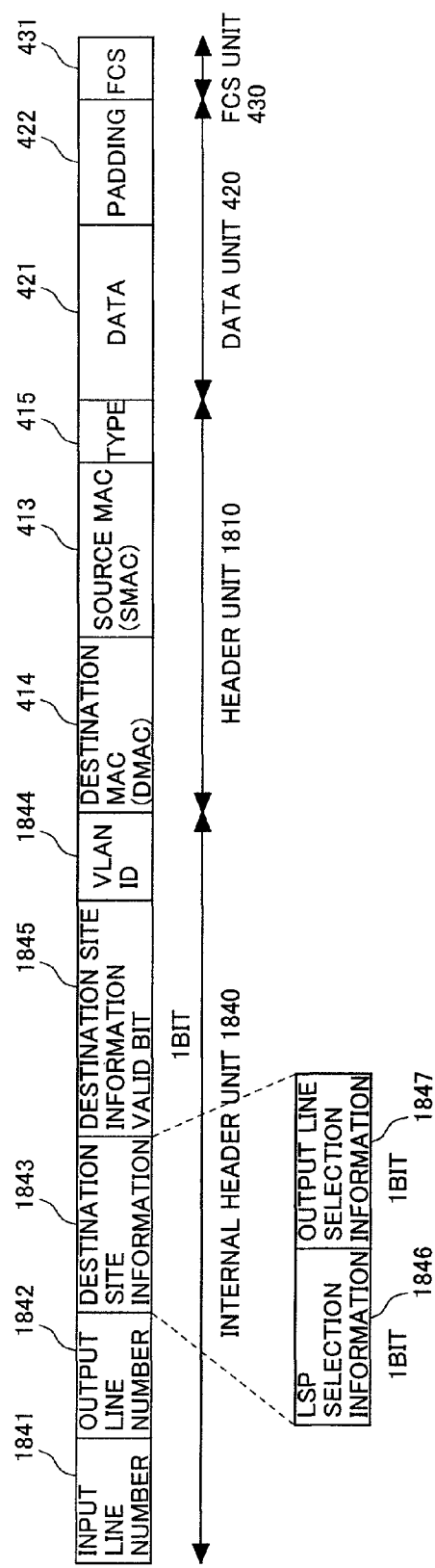
FIG. 18 is a format of frames handled in the node ME2.

FIG. 18 shows a format of the frames handled in the ME2 in this connection. Unlike the frame format shown in FIG. 3, the frame format shown in FIG. 18 has an internal header part 1840 added newly thereto and both of the preamble 411 and the SFD 412 are deleted therefrom, thereby forming the new header part 1810. This internal header part 1840 consists of fields of input line number 1841, output line number 1842, destination site information 1843 (consisting of fields of LSP selection information 1846 and output line selection information 1847), destination site information bit 1845 describing valid/invalid of the field 1843, and VLAN ID 1844.

The received frame process unit 1602-*j*, when receiving a frame through an input line 1601-*j*, deletes both preamble 411 and SFD 412 from the frame and adds the internal header part 1840 to the frame, then writes the identifier "j" of the frame input line 1601-*j* in the input line number field 1841. Then, the received frame process unit 1602-*j* stores the frame once therein and transmits the frame header information FH-j consisting of the internal header part 1840 and the header part 1810 to the header process unit 1700. The values of the output line number 1842, the destination site information 1843, the destination site information bit 1845, and the VLAN ID 1844 set in the frame header information FH-j transmitted to the header part process unit 1700 are all meaningless.

The header process unit 1700 decides the enterprise (VLAN ID) that has transmitted the frame, the output line number, and the destination site information (2 bits of LSP selection information and output line selection information) with reference to the tables 1500 and 1000 (FIGS. 4 and 5), then transmits the decided information to the received frame process unit 1602-*j* as destination information DI-j. The detail operation of the header process unit 1700 is described later.

The received frame process unit 1602, when receiving destination information DI-j, writes the information decided by the header process unit 1700 in the internal header part 1840 of the frame. In other words, the received frame process unit 1602 writes the VLAN ID of the destination information DI-j in the VLAN ID 1844 of the internal header part 1840, the output line number is written in the output line number 1842, the destination site information is written in the destination site information 1843, and the destination site information bit is written in the destination site information bit 1845 respectively. Then, the received frame process unit 1602 transmits the frame to the frame switch 1603. The received frame process unit 1602, when receiving a plurality of pieces of destination information DI-j addressed to one frame, copies the frame and transmits a copy of the frame to the frame switch 1603. At this time, at least one of the VLAN-ID 1844, the output line number 1842, and the destination site information 1843 must be different from the original one set in the internal header part 1840.

The frame switch 1603 then transmits the frame to the transmit frame process unit 1604-*j* corresponding to the output line number 1842. The transmit frame process unit 1604-*j* deletes the internal header part 1840 from and adds the preamble 411, the SFD 412, and the VLAN Tag 416 to the frame, thereby the frame format is updated as shown in FIG. 6. In other words, the process unit 1604-*j* writes the value of the VLAN ID 1844 in the VLAN ID 504 of the VLAN Tag 416, the LSP selection information of the destination site information 1843 in the LSP selection information 505 of the UP 502, the output line selection information 1847 of the destination site information 1843 in the output line selection information 506 of the UP 502, and the destination site information bit 1845 in the destination site information bit 507 respectively to change the frame format. The frame is then transmitted to the MC.

Next, the operation by the header process unit 1700 will be described with reference to FIG. 17.

The header process unit 1700, when receiving frame header information FH-j from the received frame process unit 1602-*j*, stores the frame header information FH with the frame header information storage. The frame header information FH is obtained by multiplexing a plurality of pieces of information FH-j through a multiplexer 1740.

A table access means 1721 of the VLAN ID decision unit 1720 reads an entry 1501-*i* corresponding to the input line number stored in the memory 1760 from the table 1500 (FIG. 4) to decide the VLAN ID information, then transmits the decision result VI to both of the results output unit 1750 and the table access means 1713.

The destination information decision unit 1710 refer to the table 1000 (FIG. 5) to decide both the output line number and the destination site information (LSP selection information and output line selection information) corresponding to the DMAC 414 and transmits the destination result (information DI) to the results output unit 1750.

More concretely, the table access means 1711 of the destination information decision unit 1710, when the frame header information FH is stored in the frame header information storage 1760, reads the entries 1010-*i* one by one from the table 1000 and transmits the read entries 1010-*i* to the comparator 1712. The comparator 1712 compares the information written in the frame with that set in each entry 1010-*i* so that the DMAC 414 stored in the frame header information storage 1760 is compared with the MAC address 1002-*i* set in each entry 1010-*i* and transmits the result to the table access means 1711. This comparison is repeated until it is completed for all the entries 1010-*i* in the table 1000. Each time a "matching" entry is detected in the comparison, the "matching" denoting information is transmitted to the destination information decision circuit 1714 together with the line number 1001-*i* and the destination site information 1003-*i* set in the entry 1010-*i*. On the other hand, the table access means 1713 reads the bit map 1310-*i* stored in the table 1300 (FIG. 13) corresponding to the VLAN ID information VI decided by the VLAN ID decision unit 1720 and used for the flooding operation, then transmits the result to the destination information decision circuit 1714.

Receiving each "matching" denoting information from the table access means 1711, the destination information decision circuit 1714 transmits the destination information DI to the results output unit 1750. In this information DI, the line number 1001-*i*, the destination site information 1003-*i*, and the destination site information bit "1" are set. When receiving no "matching" information, the destination information decision circuit 1714 transmits the destination information DI to the results output unit 1750. The information DI includes an output line number obtained by encoding the bit map 1310-*i* used for flooding operation, which is received from the table access means 1713, the destination site information "00", and destination site information bit "0". At this time, the destination information decision circuit 1714 does not transmit the destination information DI with respect to the bit corresponding to the input line number 1814 stored in the frame header information storage 1760. When the bit map is described so as to transmit the frame to a plurality of output lines 1605-*j*, the destination information decision circuit 1714 transmits a plurality of pieces of the destination information DI to the results output unit 1750.

Each time receiving destination information DI, the results output unit 1750 transmits the values of the destination information DI and the VLAN ID as the destination information VI DI-j to the received frame process unit 1602-*j* corresponding to the input line number 1841 stored in the frame header information storage 1760. And, because the value of the VLAN ID information VI is decided by an input line number, the same value is always set in the plurality of pieces of the destination information DI-j.

Figure 19:
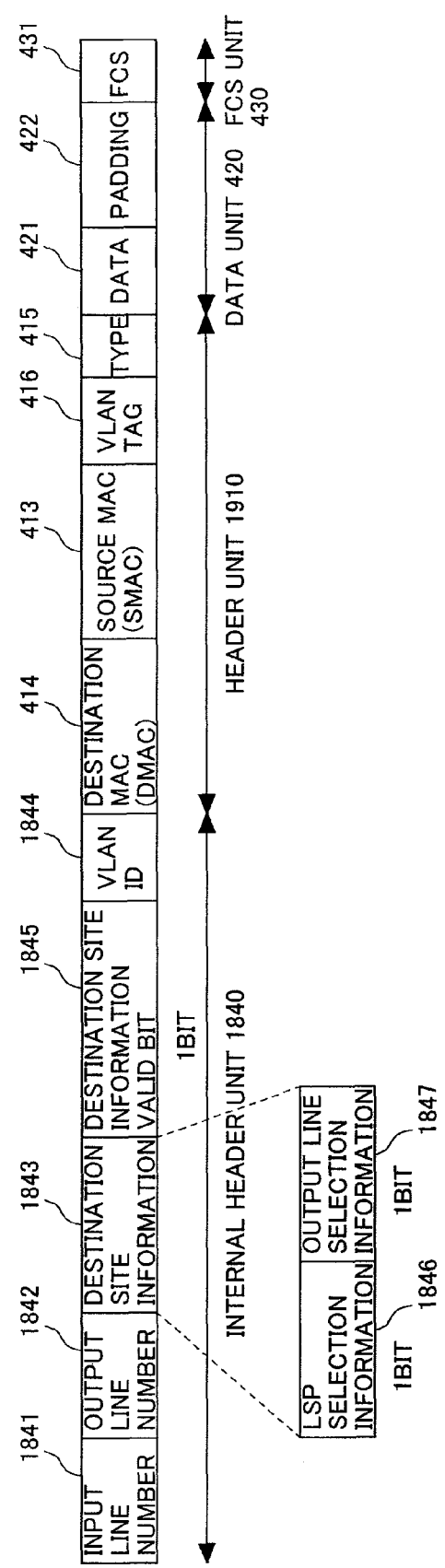
FIG. 19 is another format of frames handled in the node ME2.

While a description has been made so far for a case in which the ME2 recognizes the enterprise B and writes this information in the VLAN ID 504, the terminal T2 and the CE2 may also write the information of the enterprise B in the VLAN ID 504 to transmit frames. In this connection, the frame format in the ME2 becomes as shown in FIG. 19. At this time, the VLAN ID decision unit 1720 does not decide the VLAN ID information VI and the table access means 1713 reads the bit map 1310-*i* corresponding to the VLAN ID 504 stored in the frame header information storage 1760 and transmits the result to the destination information decision circuit 1714. The transmit frame process unit 1604-*j* does not overwrite the information of the VLAN ID 1844 on the VLAN ID 504.

[ME2 Learning Operation]

Next, a description will be made for a case in which the ME2 receives frames formatted as shown in FIG. 6 from the MC and performs the learning operation. In this connection, an internal header part 1840 is added to the format of the frames received by the ME2, thereby the frame format comes to differ from that (shown in FIG. 6) of the frames in the ME2. And, both preamble 411 and SFD 412 are deleted from the header part 510 of the frame to form a new header part 1910 (as shown in FIG. 19).

At first, the operation by the header process unit 1700 will be described. The header process unit 1700, when receiving frame header information FH-j consisting of an internal header part 1840 and a header part 1910 from the received frame process unit 1602-*j*, stores the frame header information FH obtained by multiplexing a plurality of pieces of information FH-j through the multiplexer 1740 with the frame header information storage 1760.

The destination information decision unit 1710 refers to the table 1000 (FIG. 5) to check the presence of an entry 1010-*i* corresponding to the SMAC 413 written in the frame. When it is not found, the destination information decision unit 1710 learns the input line number 1841, the LSP selection information 505 set in the UP 502, and the output line selection information 506 corresponding to the SMAC 413.

More concretely, the table access means 1711 reads the entries 1010-*i* one by one from the table 1000 and transmits the read entries 1010-*i* to the comparator 1712. The comparator 1712 compares the SMAC 413 stored in the frame header information storage 1760 of the frame with the MAC address 1002-*i* set in each entry 1010-*i* and transmits the result to the table access means 1711. The table access means 1711 and the comparator 1712 repeat the above operation until the comparison is completed for all the entries 1010-*i* in the table 1000.

When a "matching" entry 1010-*i* is detected, the table access means 1711 decides that both line number and destination site information corresponding to the SMAC 413 are already stored in the table 1000, thereby terminating the learning operation. If no "matching" entry 1010-*i* is detected, the table access means 1711 registers an entry 1010-*i* in the table 1000. The new entry 1010-*i* includes the line number 1001-*i* as the input line number 1841 stored in the frame header information storage 1760 of the frame, the MAC address 1002-*i* as the SMAC 413 stored in the frame header information storage 1760 of the frame, the destination site information 1013-*i* of the LSP selection information 1003-*i* as the LSP selection information 505 set in the UP 502, and the output line selection information 1023-*i* of the destination site information 1003-*i* as the output line selection information 506 set in the UP 502 respectively.

[Node: PE]

Figure 20:
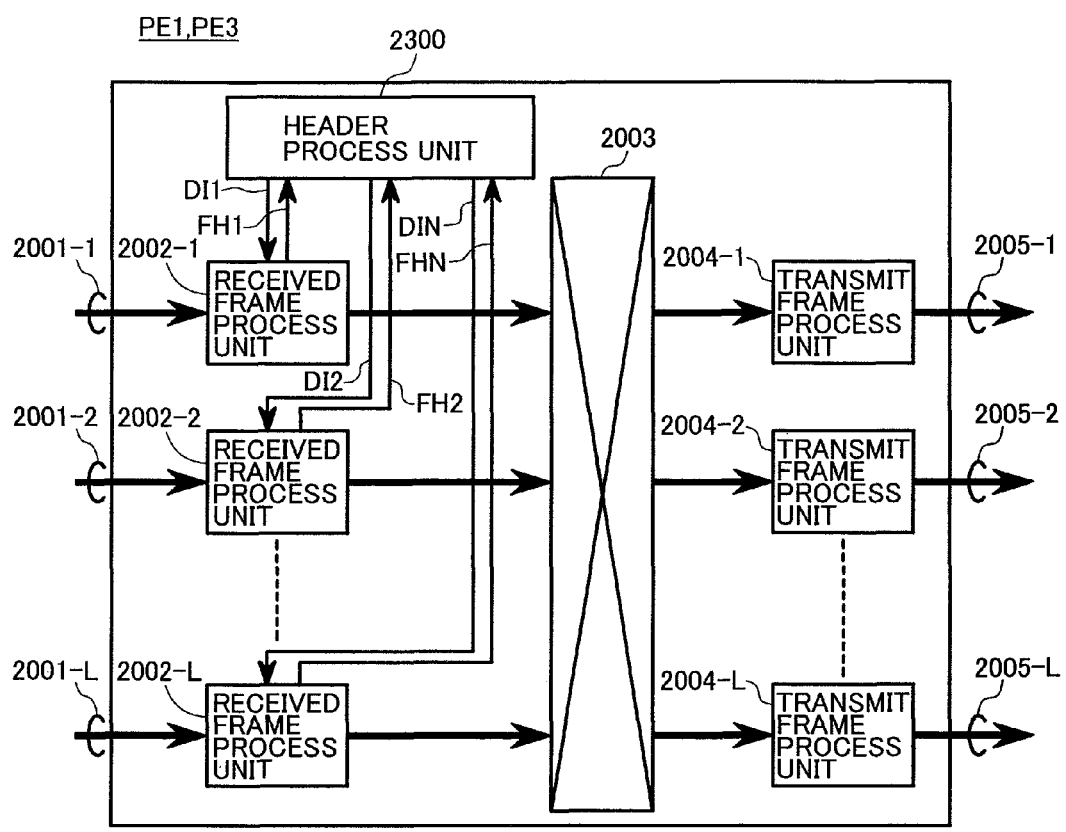
FIG. 20 is a block diagram of a major portion of each of the nodes PE1 and PE3.
Figure 21:
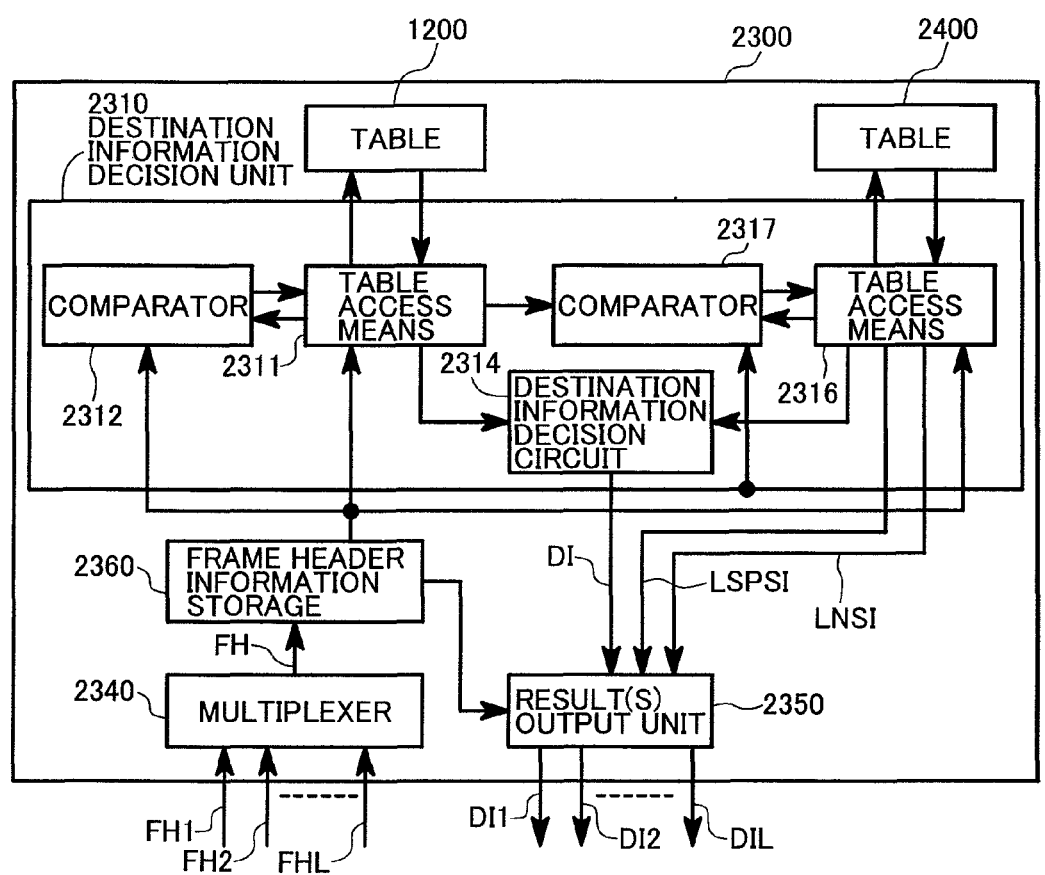
FIG. 21 is a block diagram of a header process unit provided in the node PE1.

Next, a description will be made for the operation by the PE1/PE3 employed for the network of the present invention with reference to FIGS. 1, 15, 21, and 20. FIG. 20 shows a block diagram of a major portion of the PE1/PE3. FIG. 21 shows a block diagram of a header process unit 2300 (Both PE1 and PE3 are the same in configuration).

In the embodiment to be described below, it is premised that transfer and flooding operations by the PE1 and PE3 for frames from the LAN-B1 terminal T2 to the LAN-B3 terminal T7 and learning operations by the PE3 and PE1 for frames from the terminal T7 to the terminal T2.

As shown in FIG. 20, the PE1 is configured by a received frame process unit 2002-k provided to cope with a plurality of input lines 2001-k (k=1 to L) to which frames are inputted, a transmit frame process unit 2004-k provided to cope with a plurality of output lines 2005-k from which frames are output, a header process unit 2300 for processing the header part of each inputted frame, and a frame switch 2003 for switching frames among output lines. The header process unit 2300 analyzes the header of each frame to decide the output line number and the LSP. The frame switch 2003 switches frames among output lines according to the output line number decided by the header process unit 1700.

[Transfer and Flooding Operations by PE1]

Figure 22:
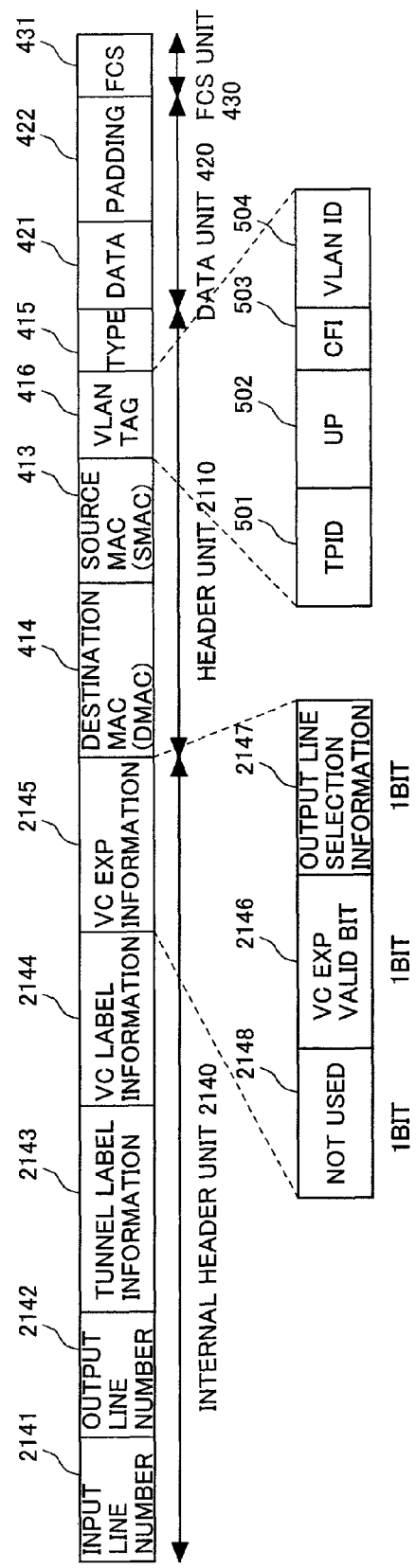
FIG. 22 is a format of frames handled in each of the nodes PE1 and PE3.

Next, a description will be made for the transfer operation by the PE1 in response to a frame received from the ME3. The format of the frames in the PE1 (shown in FIG. 22) differs from that of the frames received (shown in FIG. 6). An internal header part 2140 is added to the frame format in this case and the preamble 411 and the SFD 412 are deleted from the header part 510 of the frame format in FIG. 6 to form the new header part 2110. This internal header part 2140 consists of fields of input line number 2141, output line number 2142, tunnel label information 2143, VC label information 2144, and 3-bit VC EXP information 2145. This VC EXP information 2145 consists of fields of output line selection information 2147, VC EXP information bit 2146 for setting valid/invalid of the output line selection information 2147, and a field 2148 that is not used.

The received frame process unit 2002-k, when receiving a frame through an input line 2001-k, deletes the preamble 411 and the SFD 412 from and adds an internal header part 2140 to the frame, then writes the identifier of the input line 2001-k to which the frame is inputted in the input line number field 2141 of the frame. The received frame process unit 2002-k then stores the frame once therein and transmits the frame header information FH-k consisting of the internal header part 2140 and the header part 2110 to the header process unit 2300. In the frame header information FH-k, the values set in the output line number 2142, the tunnel label information 2143, the VC label information 2144, and the VC EXP information 2145 are all meaningless.

The header process unit 2300 decides such target information as an output line number, a tunnel label information, a VC label information, and the VC EXP information according to the VLAN ID 504 of the UP 502 set in the frame header information FH-k by referring to the table 1200 or 2400 (FIGS. 8 and 12), then transmits the decided information to the received frame process unit 2002-k as the destination information DI-k. The operation of this header process unit 2300 will be described later more in detail.

Receiving the destination information DI-k, the received frame process unit 2002-k writes the information decided by the header process unit 2300 in the internal header part 2140 of the frame. In other words, the received frame process unit 2002-k writes the output line number of the destination information DI-k in the output line number field 2142, the tunnel label information in the tunnel label information field 2143, the VC label information in the VC label information field 2144, and the VC EXP information in the VC EXP information field 2145 located respectively in the internal header part 2140. The received frame process unit 2002-k then transmits the frame to the frame switch 2003.

The frame switch 2003 transmits the frame to the transmit frame process unit 2004-k corresponding to the output line number 2142. The transmit frame process unit 2004-k deletes the internal header part 2140 from the frame and adds a capsule header part 740 thereto to format the frame as shown in FIG. 9. Concretely, the transmit frame process unit 2004-k writes the value of the tunnel label information 2143 in the tunnel label field 801 of the tunnel shim header 446, the value of the VC label information 2144 in the VC label field 901 of the VC shim header 447 and the value of the VC EXP information 2145 in the VC EXP field 902 respectively to change the frame format. After this, the transmit frame process unit 2004-k transmits the frame to the next node.

Next, the operation by the header process unit 2300 will be described with reference to FIG. 21.

The header process unit 2300, when receiving frame header information FH-k from the received frame process unit 2002-k, stores the frame header information FH obtained by multiplexing a plurality of pieces of information FH-k through the multiplexer 2340 with the frame header information storage 2360.

When the ME2 completes the learning and the UP 502 has a meaningful value ("1" is set in the destination site information bit of the UP 502), the destination information decision unit 2310 refers to the table 1200 (FIG. 8) and transmits the output line number, the tunnel label information, the VC label information, and the VC EXP information obtained from the table in correspondence with both VLAN ID 504 and UP 502 to the destination information decision circuit 2314. On the other hand, when the ME2 does not complete the learning yet and the UP 502 has a meaningless value ("0" is set in the destination site information bit of the UP 502), the destination information decision unit 2310 transmits a set of one or more output line numbers corresponding to the VLAN ID 504, the tunnel label information, the VC label information, and the VC EXP information to the destination information decision circuit 2314.

More concretely, the table access means 2311 of the destination information decision unit 2310, when the frame header information FH is stored in the frame header information storage 2360, reads entries 1210-i one by one from the table 1200 and transmits the read entries to the comparator 2312. The comparator 2312, when "1" is set in the destination site information bit, compares the information written in the frame with that set in each entry 1210-i so that the VLAN ID 501 stored in the frame header information storage 2360 of the frame is compared with the VLAN ID 1201-i set in each entry 1210-i and the LSP selection information written in the frame is compared with the LSP selection information 1202-i set in each entry 1210-i. On the other hand, when "0" is set in the destination site information bit, the comparator 2312 masks the LSP selection information 1202-i (regardless of whether or not "matching" is detected with respect to the LSP selection information) to make the comparison, that is, compares the VLAN ID 501 stored in the frame header information storage 2360 of the frame with the VLAN ID 1201-i set in each entry 1210-i and transmits the result to the table access means 2311. The above comparison is repeated until it is completed for all the entries 1210-i in the table 1200.

And, each time a "matching" entry is detected in the comparison, the comparator 2311 transmits the "matching" denoting information to the destination information decision circuit 2314 together with the line number 1204-i, the tunnel label 1205-i, and the VC label 1206-i set in the "matching" entry 1210-i. When "1" is set in the destination site information bit, the comparator 2311 sets the 3-bit VC EXP information to the lower one bit of the output line selection information 506 of the UP 502 and sets "1" in the upper second bit in the frame. The "1" denotes that the VC EXP information is valid. When "0" is set in the destination site information bit, the comparator 2312 sets "0" (denoting that the VC EXP information is invalid) in the upper second bit and transmits the result to the destination information decision circuit 2314. When "1" is set in the destination site information bit 507, the comparator 2312 decides that "matching" is detected only in the entry 1210-$i$ to be transmitted to the VC LSP-B2 and the T-LSP2 in the line connected to the PC2. When "0" is set in the destination site information bit 507, the comparator 2312 decides that "matching" is also detected in the entry 1210-$i$ to be transmitted to the VC LSP-B1 and the T-LSP1 in the line to the PC1.

Each time receiving "matching" denoting information from the table access means 2311, the destination information decision circuit 2314 transmits the line number 1201-$i$, the tunnel label 1205-$i$, the VC label 1206-$i$, and the VC EXP information to the object as the destination information DI.

The results output unit 2350 transmits one or more pieces of the destination information DI to the received frame process unit 2002-$k$ corresponding to the input line number 2141 stored in the frame header information storage 2360 as the destination information DI-k.

[Notifying Operation by PE3]

Next, the notifying operation by the PE3 will be described.

The configuration of the PE3 is the same as that of the PE1 (FIG. 20). The PE3, when receiving a frame addressed to the LAN-B1 terminal T2 from the LAN-B3 terminal T7 through the MAN-3, not only transfers the frame just like the PE1 described above, but also decides the output line selection information used for transmitting the frame addressed to the terminal T7 and writes the result in the frame to notify the ME2 of the output line selection information.

Consequently, the header process unit 2300 decides the output line selection information used for selecting a line to the MAN-3 and adds the output line selection information to the information DI-k in transfer operation by the PE1, then transmits the frame to the received frame process unit 2002-$k$. More concretely, each time the PE3 decides a "matching" entry 1210-$i$1 in the above transfer operation, the table access means 2311 reads the entry 1210-$i$2 paired with the entry 1210-$i$1 and decides that the VC label 1206-$i$2 set in the entry 1210-$i$2 is the target VC label 1 and the line number 1204-$i$2 set in the entry 1210-$i$2 is the target output line number 1, then notifies the comparator 2317 of the decision results.

To read such a pair of entries, for example, the table access means 2311 is just required to assume the addresses of the entries 1210-$i$1 and 1210-$i$2 as consecutive integers (2n and 2n+1) and read the entry 1210-($i$+1) from the address 2$n$+1 when it is decided that the address 2$n$ matches with that of the entry 1210-$i$ and read the entry 1210-($i$−1) from the address 2$n$ when it is decided that the address 2$n$+1 matches with that of the entry 1210-$i$. In addition, the table access means 2316 reads the entries 2410-$i$ one by one from the table 2400 and transmits the read entries 2410-$i$ to the comparator 2317.

The comparator 2317 compares the information written in the frame with that set in each entry 1210-$i$ so that the input line number 2141 stored in the frame header information storage 2360 of the frame is compared with the input number 2401-$i$ set in each entry 2410-$i$, the VC label 1 written in the frame is compared with the VC label 2403-$i$ set in each entry 2410-$i$, and the output line number 1 written in the frame is compared with the output line number 2404-$i$ set in each entry 2410-$i$. The comparator 2317 then transmits the results to the table access means 2316. The table access means 2316 and the comparator 2317 repeat the above operation until the comparison is completed for all the entries 2410-$i$ in the table.

The table access means 2316 transmits the output line selection information 2406-$i$ set in the VC EXP 2403-$i$ field of the "matching" entry 2410-$i$ to the results output unit 2350 as the output line selection information LSNI. The results output unit 2350 transmits the above information to the received frame process unit 2002-$k$ as a portion of the destination information DI-k.

The received frame process unit 2002-$k$ writes this output line selection information in the output line selection information field 506 of the UP 502 in the frame and transfers the frame to the frame switch 1603.

[Transfer and Flooding Operations by PE3]

Next, how the PE3 transfers each frame received from the PC3 will be described.

In this case, the frame format in the PE1 differs from that of received frames shown in FIG. 9. An internal header part 2140 is added to each received frame and both preamble 411 and SFD 412 are deleted from the capsule header part 740 to form a new header 2240 as shown in FIG. 23.

Figure 23:
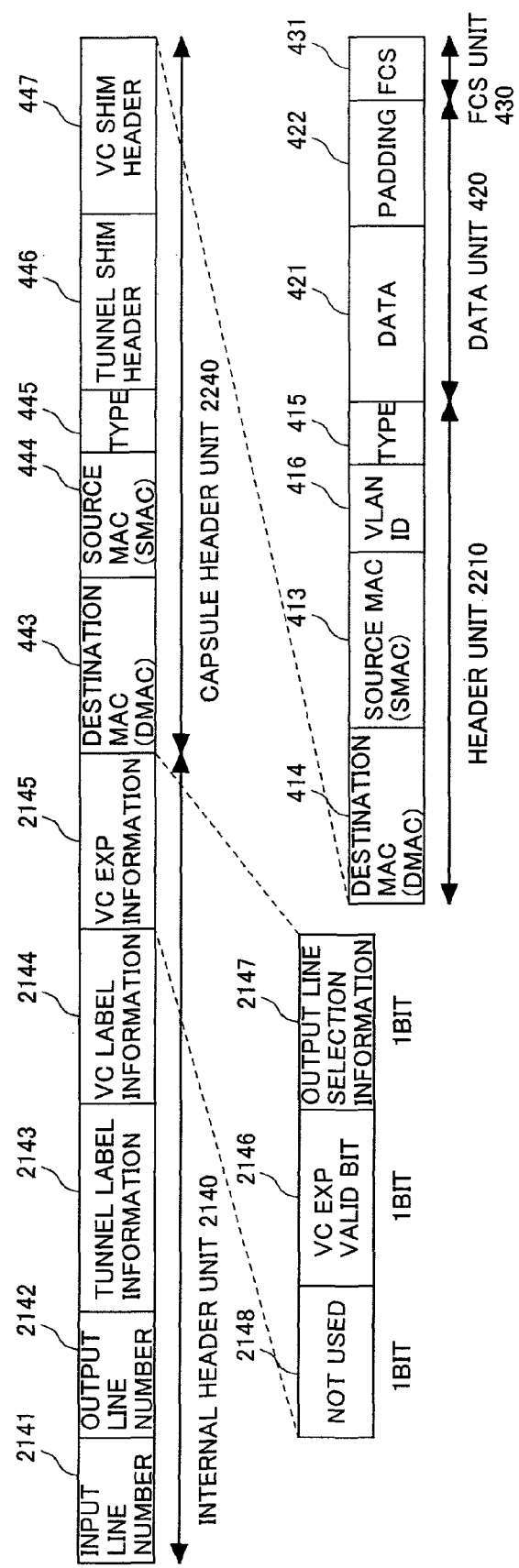
FIG. 23 is another format of frames handled in each of the nodes PE1 and PE3.

Receiving a frame through an input line 2001-$k$, the received frame process unit 2002-$k$ adds the internal header part 2140 to the frame and deletes the preamble 411 and the SFD 412 from the header part 2210 of the frame, then writes the identifier of the input line 2001-$k$ to which the frame is inputted in the input line number field 2141 of the frame to change the frame format as shown in FIG. 23. The received frame process unit 2002-$k$ also stores the frame once therein, then transmits the frame header information FH-k consisting of the internal header part 2140, the capsule header part 2240, and header part 2210 to the header process unit 2300. The header process unit 2300 decides the target output line number according to the frame header information FH-k and transmits the result to the received frame process unit 2002-$k$ as the destination information DI-k. The operation by this frame header process unit 2300 will be described later more in detail.

After this, the received frame process unit 2002-$k$ writes the output line number set in the destination information DI-k in the output line number field 2142 of the internal header part 2140 and transmits the frame to the frame switch 2003. The frame switch 2003 then transmits the frame to the transmit frame process unit 2004-$k$ corresponding to the output line number 2142. The transmit frame process unit 2004-$k$ deletes the internal header part 2140 and the capsule header part 2240 from the frame and adds the preamble 411 and the SFD 412 to the frame to change the frame format as shown in FIG. 6, then transmits the frame to the next node.

Next, the operation by the header process unit 2300 will be described with reference to FIG. 21.

The header process unit 2300, receiving a plurality of pieces of frame header information FH-k from the received frame process unit 2002-$k$, stores the frame header information FH obtained by multiplexing a plurality of pieces of information FH-k through the multiplexer 2340 with the frame header information storage 2360.

The destination information decision unit 2310 refers to the table 2400 (FIG. 12) to decide the target output line number. More concretely, the table access means 2316 reads the entries 2410-$i$ one by one from the table 2400 and transmits the read entries 2410-$i$ to the comparator 2317. The comparator 2317 then compares the information written in the frame with that set in each entry 2410-$i$ so that, when "1" is set in the VC EXP information bit 906 located in the VC EXP 902, the input line number 2141 stored in the frame header information storage 2360 of the frame is compared with the input line number 2401-*i* set in each entry 2410-*i*, the VC label 901 stored in the frame header information storage 2360 of the frame is compared with the VC label 2402-*i* set in each entry 2410-*i*, and the output line selection information 905 of the VC EXP 902 stored in the frame header information storage 2360 of the frame is compared with the output line selection information 2406-*i* of the VC EXP 2403-*i* set in each entry 2410-*i*.

On the other hand, when "0" is set in the VC EXP information bit 906, the comparator 2317 masks the output line selection information (regardless of whether or not the output line selection information matches with the target) to make the comparison. In other words, the comparator 2317 makes comparisons as described above so that the input line number 2141 stored in the frame header information storage 2360 of the frame is compared with the input line number 2401-*i* set in each entry 2410-*i* and the VC label 901 stored in the frame header information storage 2360 of the frame is compared with the VC label 2402-*i* set in each entry 2410-*i*.

The comparator 2317 transmits the results to the table access means 2316. The table access means 2316 and the comparator 2317 repeat the above operation until the comparison is completed for all the entries 2410-*i* in the table 2400.

Each time "matching" is detected in the above comparison with respect to an entry 2410-*i*, the comparator 2316 transmits the "matching" denoting information to the destination information decision circuit 2314 together with the output line number 2404-*i* set in the "matching" entry 2410-*i*. When the ME2 completes the learning and the VC EXP 902 has a meaningful value (that is, "1" is set in the VC EXP information bit 906), the PE3 decides "matching" only in the entry 2410-*i* to be transmitted to the MAN-3. When the ME2 does not complete the learning and the VC EXP 902 has a meaningless value (that is, "0" is set in the VC EXP information bit 906), the ME2 also decides "matching" in the entry 1210-*i* to be transmitted to the MAN-4.

The destination information decision circuit 2314 transmits one or more line numbers 2404-*i* received from the table access means 2316 to the results output unit 2350 as the destination information DI. The results output unit 2350, each time receiving the destination information DI, transfers the information to the received frame process unit 2002-*k* corresponding to the input line number 2141 stored in the frame header information storage 2360 as the destination information DI-k.

[Notifying Operation by PE1]

Next, the notifying operation of the PE1 will be described.

The PE1, when receiving a frame addressed to the terminal T2 from the terminal T7, not only transfers the frame just like the PE3 described above, but also decides the LSP selection information used for transmitting the above frame addressed to the terminal T7 and writes the result in the frame to notify the ME2 of the LSP selection information.

Consequently, the header process unit 2300 decides the LSP selection information and transmits the information to the received frame process unit 2002-*k* as a portion of the destination information DI-k. More concretely, the table access means 2316 reads the entries 2410-*i* one by one from the table 2400 (FIG. 12) and transmits the read entries 2410-*i* to the comparator 2317. The comparator 2317 then compares the information written in the frame with that set in each entry 2410-*i* so that the input line number 2141 set in the frame header information storage 2360 of the frame is compared with the input line number 2401-*i* set in each entry 2410-*i* and the VC label 901 set in the frame header information storage 2360 of the frame is compared with the VC label 2402-*i* set in each entry 2410-*i*. After this, the comparator 2312 transmits the results to the table access means 2316. The table access means 2316 and the comparator 2317 repeat the above operation until the comparison is completed for all the entries 2410-*i* in the table 2400.

The table access means 2316 transmits the LSP selection information 2405-*i* obtained from the "matching" entry 1410-*i* to the results output unit 2350 as the LSP selection information LSPSI. At this time, the VC EXP 2403-*i* is masked, so that "matching" comes to be detected in a plurality of entries 2410-*i* in which the values of the VC EXP2 differs from each other. However, because the value of the LSP selection information 2405-*i* in all those entries 2410-*i* are the same, the value in any of those entries 2410-*i* may be transmitted to the results output unit 2350.

The results output unit 2350 then transmits the LSP selection information LSPSI to the received frame process unit 2002-*k* as a portion of the destination information DI-k. When it is required to transmit a plurality of pieces of destination information DI-k, each including a unique output line number, the same value is set in all those pieces of the LSP selection information.

The received frame process unit 2002-*k* writes the LSP selection information set in the destination information DI-k in the LSP selection information 505 of every frame to be transmitted to the frame switch 1603, then transfers the frames to the ME2.

What is claimed is:

1. A frame transfer method employed for a network configured by a plurality of nodes including a local node, a starting node of a transfer path in the network, and a terminating node, the local node being located between a terminal for transmitting a frame and the starting node, and the transfer path in the network being defined between the starting node and the terminating node, the method comprising the steps of:

by the local node, receiving the frame transmitted from the terminal;

by the local node, writing in the received frame, transfer path selection information for specifying a transfer path in the network to be used by the starting node of the transfer path for transferring the received frame through the network, and output line selection information for specifying an output line outside of the network to be used by the terminating node of the transfer path for outputting the transferred frame from the terminating node of the transfer path specified by the transfer path selection information, by the local node, transmitting to the starting node, the frame in which the transfer path selection information and the output line selection information are written;

by the local node, transmitting to the starting node, the transfer path selection information corresponding to a plurality of destination terminal addresses which correspond to a plurality of said output line to which frames are to be transferred via the network, and the output line selection information corresponding to the plurality of destination terminal addresses for transmission to the terminating node;

by the starting node, receiving the frame transferred from the local node;

by the starting node, deciding a transfer path in the network to be used for transferring the received frame through the network according to the transfer path selection information included in the received frame, the transfer path selection information specifying the transfer path in the network leading to a destination of the frame outside of the network, by the starting node, transmitting the received frame to the terminating node on the network of the transfer path in the network decided by the starting node;

wherein the local node is connected between the terminal and the starting node:

by the starting node, writing the transfer path selection information in the frame;

by the starting node, transmitting, to the terminating node on the network, the transfer path selection information corresponding to a plurality of destination terminal addresses which correspond to a plurality of said destination of frames outside the network to which frames are to be transferred via the network, and destination selection information corresponding to the plurality of destination terminal addresses for transmission to the terminating node;

by the terminating node, receiving the frame transmitted from the local node for receiving the frame through the starting node of the transfer path;

by the terminating node, deciding an output line outside of the network to be used for transmitting the frame according to the output line information included in the received frame, the output line information specifying the output line outside of the network decided from a destination of the frame;

by the terminating node, transmitting the received frame to the terminal of destination of the frame through the output line outside of the network decided by the step of deciding by the terminating node; and by the terminating node, transmitting to the starting node, transfer path selection information corresponding to a plurality of destination terminal addresses which correspond to a plurality of said output line to which frames are to be transferred via the network, and output line selection information corresponding to the plurality of destination terminal addresses for transmission to the terminal.

2. A frame transfer method according to claim 1, further comprising the step of:

communicating by MPLS packet transfer between the starting node and the terminating node via the transfer path on the network.

3. A frame transfer method in a network system which includes a starting node coupled to a terminal for transmitting a frame to the starting node via a local node, and a terminating node, wherein a transfer path is defined between the starting node and the terminating node through the network, the frame transfer method comprising the steps of:

by the starting node, receiving the frame transferred from the local node;

by the starting node, deciding a transfer path in the network to be used for transferring the received frame through the network according to transfer path selection information included in the received frame, the transfer path selection information specifying the transfer path in the network leading to a destination of the frame outside of the network, by the starting node, transmitting the received frame to a terminating node on the network of the transfer path in the network decided by the starting node;

wherein the local node is connected between the terminal and the starting node;

by the starting node, writing the transfer path selection information in the frame;

by the starting node, transmitting, to the terminating node on the network, the transfer path selection information corresponding to a plurality of destination terminal addresses which correspond to a plurality of said destination of frames outside the network to which frames are to be transferred via the network, and destination selection information corresponding to the plurality of destination terminal addresses for transmission to the terminating node;

by the terminating node, receiving the frame transmitted from the local node for receiving the frame through the starting node of the transfer path;

by the terminating node, deciding an output line outside of the network to be used for transmitting the frame according to the output line information included in the received frame, the output line information specifying the output line outside of the network decided from a destination of the frame;

by the terminating node, transmitting the received frame to the terminal of destination of the frame through the output line outside of the network decided by the step of deciding by the terminating node; and by the terminating node, transmitting, to the starting node, transfer path selection information corresponding to a plurality of destination terminal addresses which correspond to a plurality of said output line to which frames are to be transferred via the network, and output line selection information corresponding to the plurality of destination terminal addresses for transmission to the terminal.

4. A transfer method according to claim 3, further comprising the step of:

communicating by common packet transfer between the starting node and the terminating node via the transfer path on the network.

5. A transfer method according to claim 3, wherein the common packet transfer is by Multi-Protocol Label Switching (MPLS).

6. A transfer method according to claim 3, further comprising the steps of:

by the local node, receiving the frame transmitted from the terminal;

by the local node, writing, in the received frame, transfer path selection information for specifying a transfer path in the network to be used by the starting node of the transfer path for transferring the received frame through the network, and output line selection information for specifying an output line outside of the network to be used by the terminating node of the transfer path for outputting the transferred frame from the terminating node of the transfer path specified by the transfer path selection information, by the local node, transmitting to the starting node, the frame in which the transfer path selection information and the output line selection information are written; and by the local node, transmitting to the starting node, the transfer path selection information corresponding to a plurality of destination terminal addresses which correspond to a plurality of said output line to which frames are to be transferred via the network, and the output line selection information corresponding to the plurality of destination terminal addresses for transmission to the terminating node.

7. A network system including a frame transfer device which is connected to a node for receiving a frame from a terminal and to a starting node of a transfer path in a network, the frame transfer device being further connected through the network to a plurality of terminating nodes of the transfer path in the network, and yet further to a terminal of destination of the frame,
wherein the frame transfer device comprises:
a frame transmission/reception unit for receiving the frame transferred by the node; and
a header process unit for deciding a transfer path in the network to be used for transferring the received frame through the network according to transfer path selection information included in the received frame, the transfer path selection information specifying the transfer path in the network leading to a destination of the frame outside of the network; and for deciding an output line outside of the network to be used for transmitting the frame according to an output line selection information included in the received frame, the output line selection information specifying the output line outside of the network decided from a destination of the frame,
wherein the frame transmission/reception unit transmits the received frame to a terminating node on the network of the transfer path in the network decided by the header process unit, and further to the terminal of destination of the frame through the output line outside of the network decided by the header process unit;
the node is connected between the terminal and the frame transfer device;
the transfer path selection information and the output line information are written in the frame by the node;
the frame transmission/reception unit transmits, to the starting node on the network, transfer path selection information corresponding to a plurality of destination terminal addresses which correspond to a plurality of said destination of frames outside the network to which frames are to be transferred via the network, and which further correspond to a plurality of said outside line via which the frames are to be transferred from the network to said destination of frames outside the network; destination selection information corresponding to the plurality of destination terminal addresses for transmission to the terminating node; and output line selection information corresponding to the plurality of destination terminal addresses for transmission to the terminal;
the network is a Multi-Protocol Label Switching (MPLS) network; and
the frame transmission/reception unit transmits from outside the MPLS network to the MPLS network when transmitting the frame.

8. A network system according to claim 7,
wherein the header process unit writes, in the received frame, the transfer path selection information and the output line selection information;
wherein the frame transmission/reception unit transmits to the starting node the frame in which the transfer path selection information and the output line selection information are written;
the frame transfer device is connected between the terminal for transmitting the frame and the starting node of the transfer path.

\* \* \* \* \*